(12) United States Patent
Kurita et al.

(10) Patent No.: US 6,525,834 B2
(45) Date of Patent: *Feb. 25, 2003

(54) IMAGE PROCESSING APPARATUS

(75) Inventors: Mitsuru Kurita, Tokyo (JP); Masahiro Funada, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 76 days.

(21) Appl. No.: 08/843,069

(22) Filed: Apr. 11, 1997

(65) Prior Publication Data

US 2002/0051219 A1 May 2, 2002

Related U.S. Application Data

(62) Division of application No. 08/191,719, filed on Feb. 4, 1994, now abandoned, which is a continuation of application No. 07/644,622, filed on Jan. 23, 1991, now abandoned.

(30) Foreign Application Priority Data

Jan. 25, 1990 (JP) ............................... 2-16808

(51) Int. Cl.[7] ............................................. G06F 15/00
(52) U.S. Cl. ........................ 358/1.18; 382/297; 399/85
(58) Field of Search ............................ 355/55; 358/496, 358/300, 296, 448, 488, 451, 407, 280, 408, 530, 1.18, 1.2; 346/134; 271/9.03; 382/297, 173; 399/82, 86, 391, 85, 23; 345/439

(56) References Cited

U.S. PATENT DOCUMENTS

| 4,562,485 A | | 12/1985 | Maeshima | 358/280 |
|---|---|---|---|---|
| 4,635,212 A | * | 1/1987 | Hatazawa | 382/297 |
| 4,682,877 A | | 7/1987 | Fujiwara et al. | 355/3 R |
| 4,731,672 A | | 3/1988 | Sugishima et al. | 358/296 |
| 4,776,026 A | * | 10/1988 | Ueyama | 382/297 |
| 4,809,041 A | | 2/1989 | Funada | 355/14 C |
| 4,893,258 A | | 1/1990 | Sakuragi | 364/521 |
| 4,908,672 A | | 3/1990 | Ito | 355/311 |
| 4,947,266 A | | 8/1990 | Watanabe et al. | 358/408 |
| 4,965,871 A | | 10/1990 | Ogura et al. | 355/55 |
| 5,001,574 A | | 3/1991 | Shimizu et al. | 358/448 |
| 5,016,116 A | | 5/1991 | Maeshima | 358/448 |
| 5,021,876 A | | 6/1991 | Kurita et al. | 358/75 |
| 5,027,227 A | | 6/1991 | Kita | 358/488 |
| 5,028,041 A | * | 7/1991 | Kobayashi | 271/9.03 |
| 5,031,116 A | * | 7/1991 | Shukunami et al. | 395/102 |
| 5,040,078 A | | 8/1991 | Yahara | 358/448 |
| 5,072,311 A | | 12/1991 | Hiramatsu et al. | 358/487 |
| 5,093,653 A | | 3/1992 | Ikehira | 340/727 |
| 5,148,295 A | | 9/1992 | Matsubara | 358/451 |
| 5,165,072 A | | 11/1992 | Kurita et al. | 358/448 |
| 5,420,938 A | | 5/1995 | Funada et al. | 382/173 |
| 5,617,224 A | | 4/1997 | Ichikawa et al. | 358/530 |

FOREIGN PATENT DOCUMENTS

| JP | 60-148275 | 8/1985 |
|---|---|---|
| JP | 61-177067 | 8/1986 |
| JP | 62-181155 | 8/1987 |
| JP | 64-11058 | 1/1989 |
| JP | 2-46065 | 2/1990 |
| JP | 2-44063 | 3/1990 |
| JP | 2-121863 | 5/1990 |

* cited by examiner

Primary Examiner—Joseph Mancuso
Assistant Examiner—Vikkram Bali
(74) Attorney, Agent, or Firm—Fitzpatrick, Cella, Harper & Scinto

(57) ABSTRACT

An image processing apparatus includes an input unit for inputting an image signal representing an original image, a processing unit for performing image processing of the image signal input from the input unit, and a recording unit for recording an image on a recording medium on the basis of the image signal subjected to the image processing by the processing unit. The processing unit performs rotation processing of the image signal in accordance with the shapes of the original image and the recording medium.

20 Claims, 23 Drawing Sheets

| MODE | INPUT IMAGE | OUTPUT IMAGE | RESULT |
|---|---|---|---|
| 1 | LENGTH < BREADTH | LENGTH < BREADTH | AS IT IS |
| 2 | BREADTH > LENGTH | BREADTH > LENGTH | AS IT IS |
| 3 | LENGTH > BREADTH | BREADTH > LENGTH | ROTATION |
| 4 | BREADTH > LENGTH | LENGTH > BREADTH | ROTATION |

INPUT IMAGE

OUTPUT IMAGE

ROTATION

SUBSCANNING

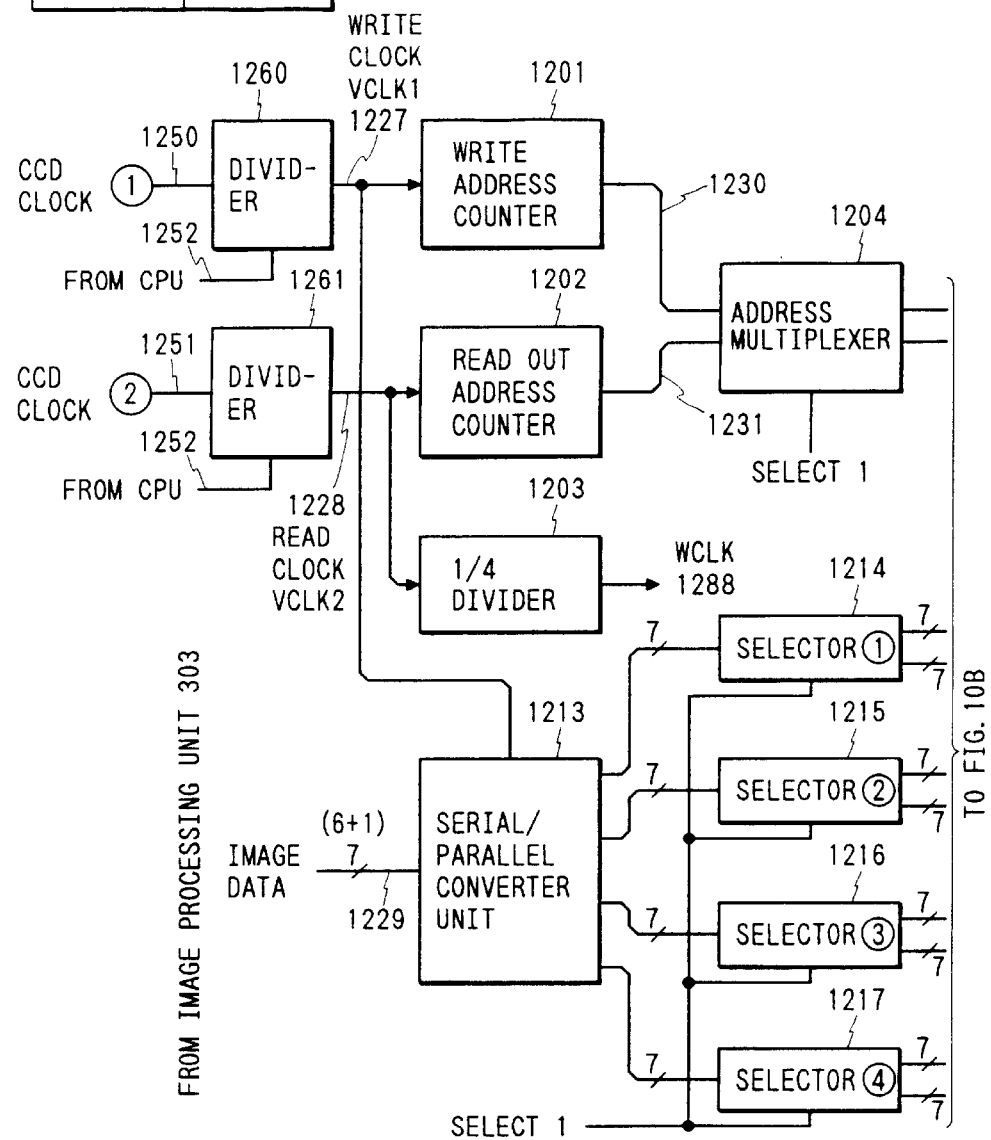

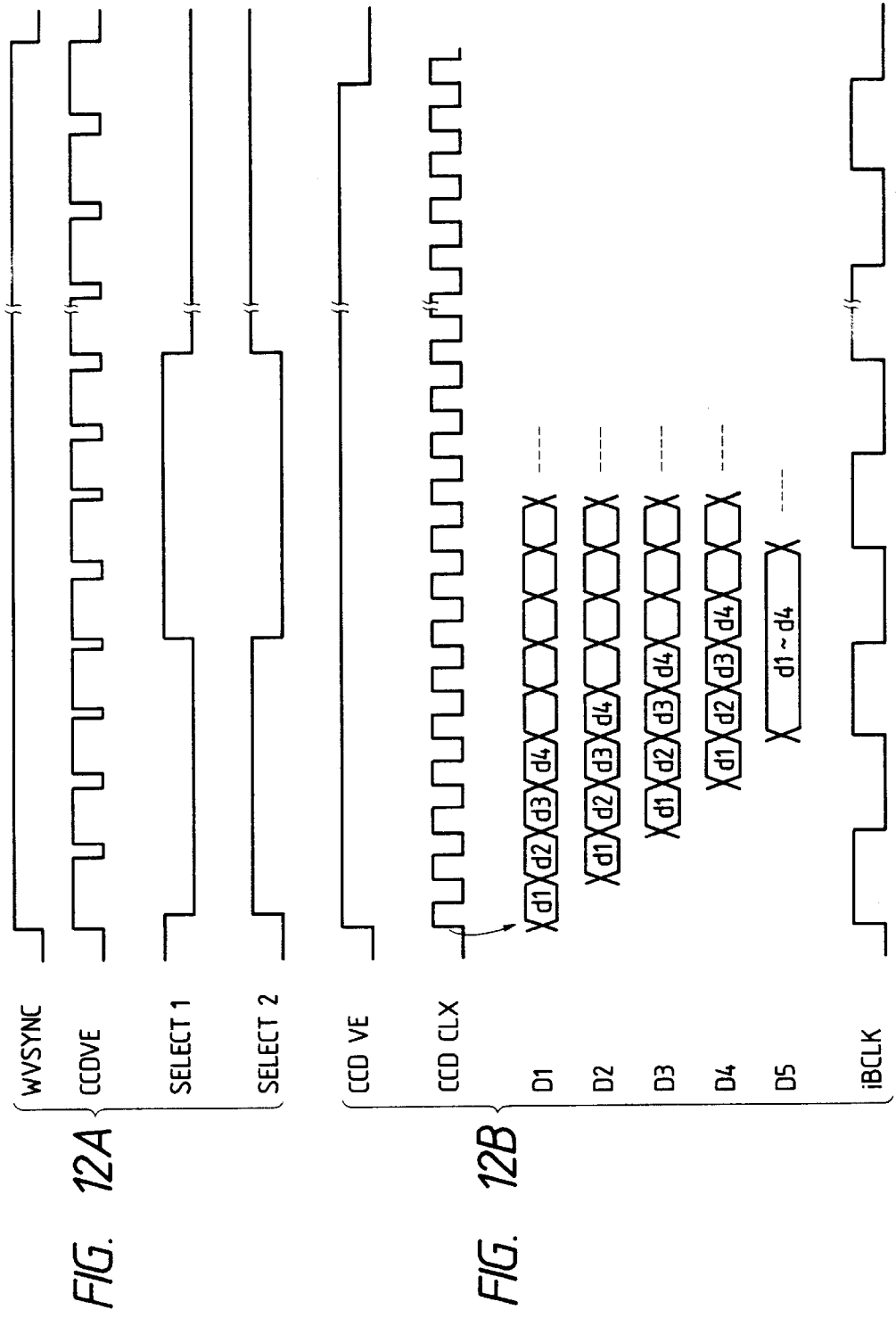

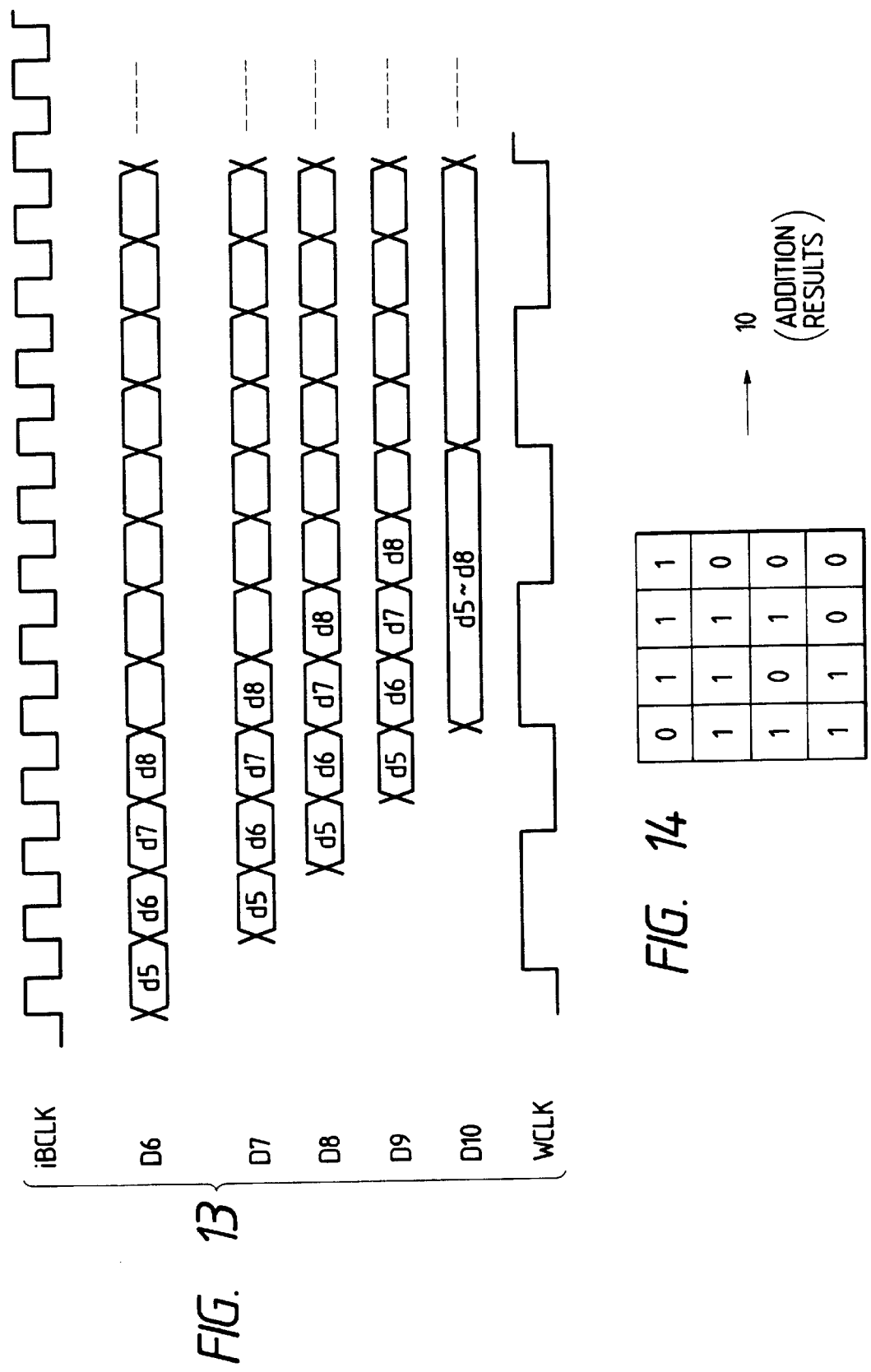

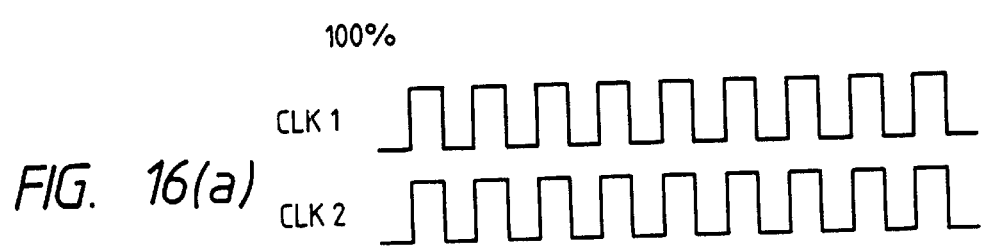
FIG. 16(a) — 100% CLK 1, CLK 2
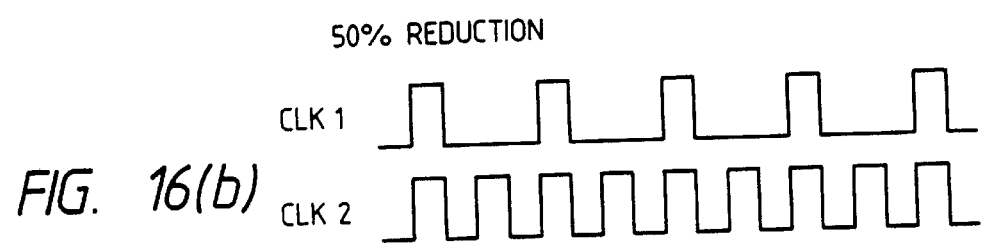
FIG. 16(b) — 50% REDUCTION CLK 1, CLK 2
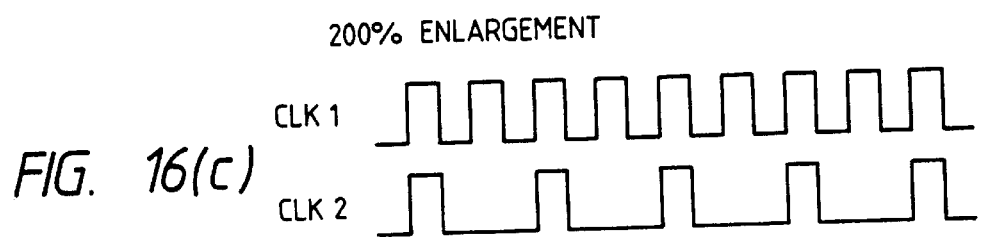
FIG. 16(c) — 200% ENLARGEMENT CLK 1, CLK 2

| MODE | WROT | RROT |
|---|---|---|
| NON-ROTATION | φ | φ |
| | φ | φ |
| ROTATION | φ | 1 |
| | 1 | φ |

MAIN SCANNING DIRECTION

SUB SCANNING DIRECTION

IMAGE PROCESSING APPARATUS

This application is a division, of application Ser. No. 08/191,719 filed Feb. 4, 1994 now abandoned, which is a continuation of application No. 07/644,622 filed Jan. 23, 1991 now abandoned.

BACKGROUND OF THE INVENTION

1. Field of the Invention

The present invention relates to an image processing apparatus which can execute processing, e.g., rotation, of an input image obtained by, e.g., reading an original image, and can output the processed image.

2. Related Background Art

Conventionally, when an A4-size original is enlarged and recorded on, e.g., an A3-size recording medium, or when an A3-size original is reduced and recorded on an A4-size recording medium, such image processing is realized by aligning an original set direction with a convey direction of a recording medium, or vice versa.

In U.S. patent application Ser. No. 220,936 filed by the present applicant on Jun. 23, 1988, when automatic variable magnification processing is performed on a desired area on an original, variable magnifications associated with the longitudinal direction and the widthwise direction are determined in accordance with the length and breadth of the desired area, and processing is performed, so that an image is always recorded on the entire area of a recording medium.

However, in the related art, when an operator sets an original or a recording medium or when he or she performs area designation using an area input device (e.g., a digitizer), he or she must perform designation in consideration of, e.g., the direction of the original. For this reason, an operation error occurs, thus obtaining a wrong output image.

SUMMARY OF THE INVENTION

The present invention has been made in consideration of the above situation, and has as its object to provide an image processing apparatus which can satisfactorily and efficiently record an original image on a recording medium.

It is another object of the present invention to provide an image processing apparatus which can consider the shape of an original or a designated area and the shape of a recording medium, and can record an original image on a recording medium without omission and without forming an idle space.

It is still another object of the present invention to provide an image processing apparatus which can rotate and record an original image in accordance with the direction of the original image and the direction of a recording medium.

It is still another object of the present invention to provide an image processing apparatus which can satisfactorily record an original image on a recording medium under the read or write control of a memory means for storing an image signal.

The above and other objects and effects of the present invention will be apparent from the following description.

BRIEF DESCRIPTION OF THE DRAWINGS

FIGS. 12A and 12B, FIG. 13 and FIGS. 16(a) to 16(c) are operation timing charts of the block cut out unit;

FIG. 14 shows a block;

DETAILED DESCRIPTION OF THE PREFERRED EMBODIMENTS

The preferred embodiments of the present invention will be described hereinafter.

Figure 2:
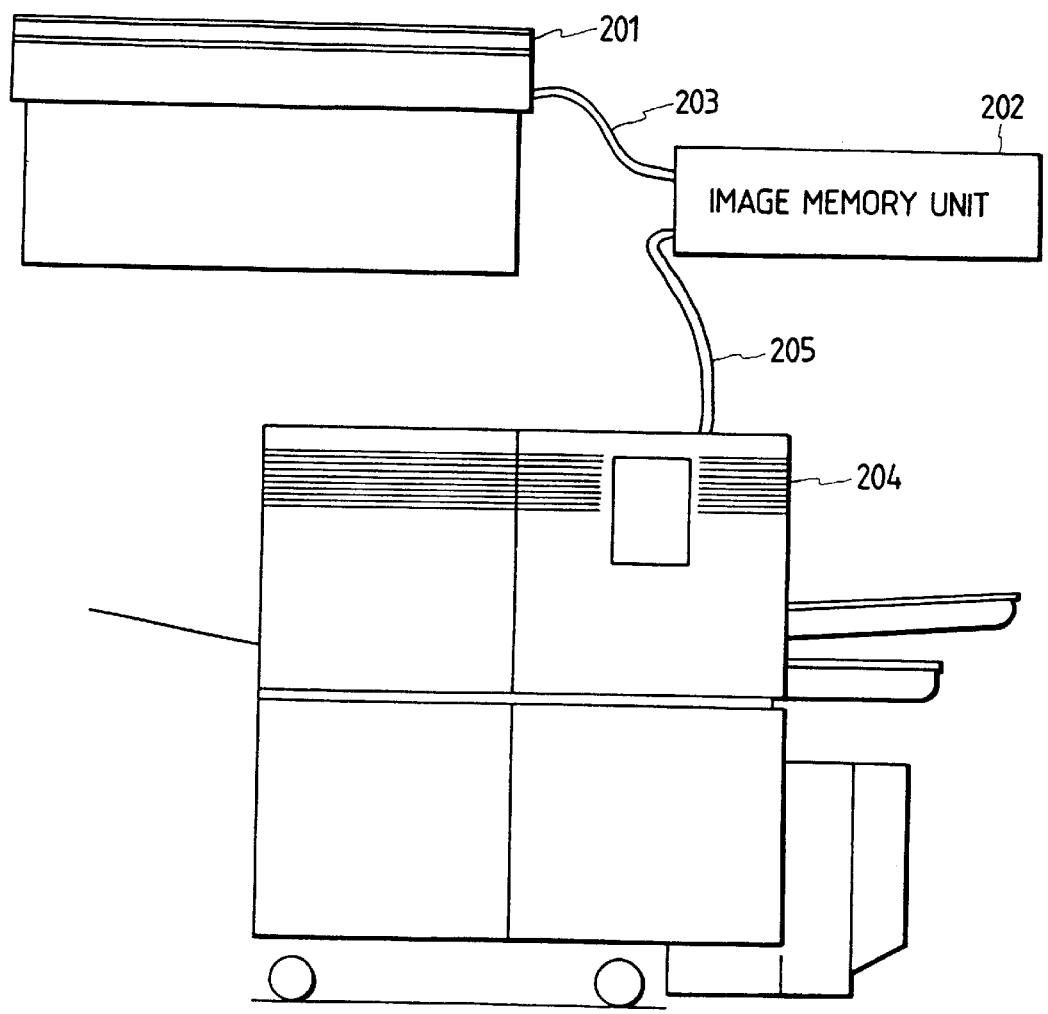
FIG. 2 is a side view showing an outer appearance of the image processing apparatus.

FIG. 2 shows an outer appearance of an apparatus according to this embodiment.

A reader 201 optically reads an original, converts the read original image into a digital signal, and performs various image processing operations. An image memory unit 202 is connected to the reader 201 via a communication cable 203, and stores an image signal sent through the cable 203. A printer unit 204 prints out an image on a recording medium on the basis of an image signal. The printer unit 204 is also connected to the image memory unit 202 via a communication cable 205.

Figure 1:
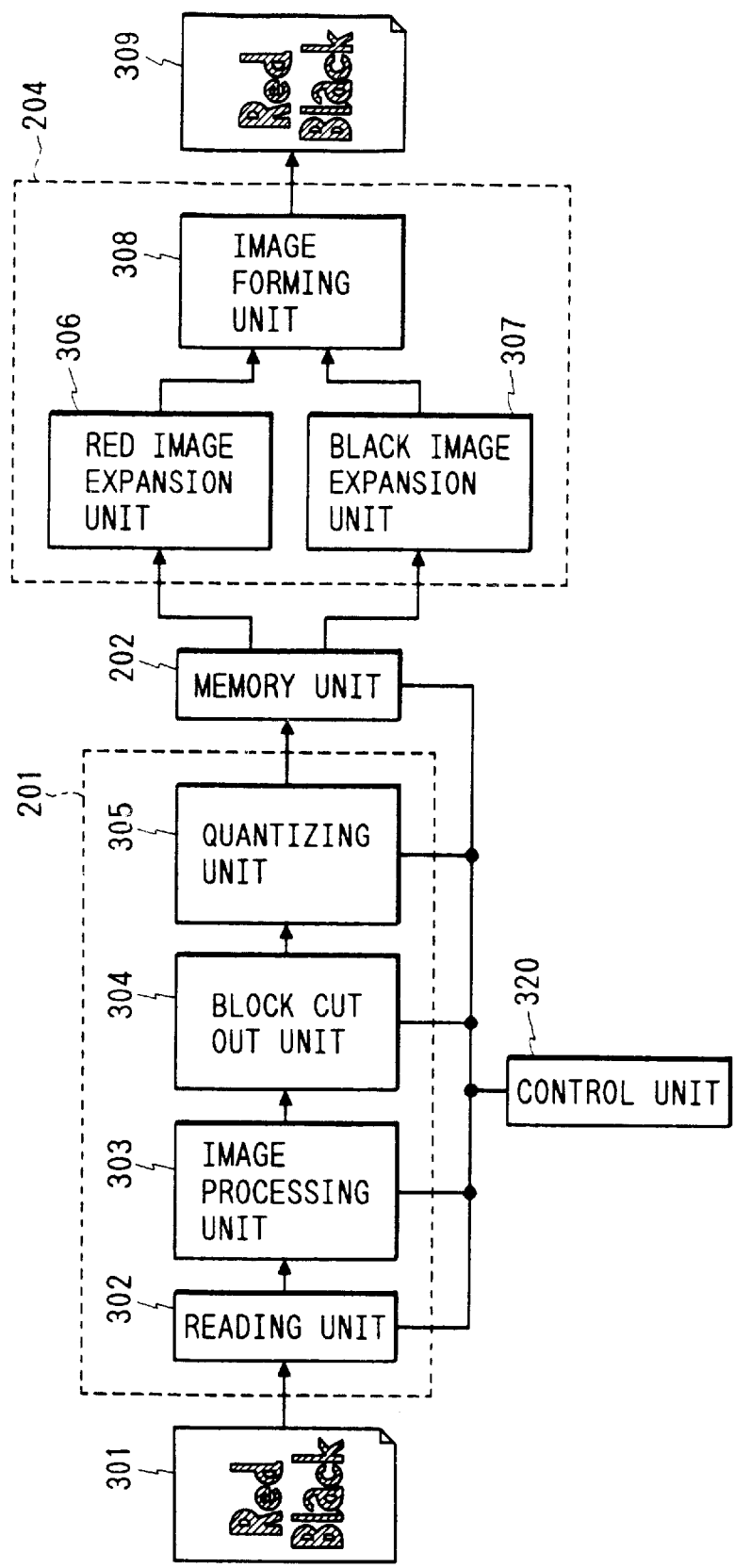
FIG. 1 is a block diagram of an image processing apparatus according to the present invention.

FIG. 1 is a block diagram associated with signal flows of the overall apparatus. In the following description, blocks common to FIG. 1 are designated by common reference numerals.

A red/black two-color original 301 is read by a reading unit 302 of the reader 201, and is converted into a digital electrical signal. The digital electrical signal is subjected to various image processing operations in an image processing unit 303. The processed image is cut out in units of 4×4 blocks by a block cut out unit 304, and the blocks are then quantized by a quantizing unit 305. The quantized blocks are sent to the image memory unit 202.

A control unit 320 supplies necessary information to the units 302 to 305, and 202 in accordance with a command input by an operator.

An image signal sent from the image memory unit 202 to the printer unit 204 is sent to two systems, i.e., a red image expansion unit 306 and a black image expansion unit 307, and is respectively expanded as red and black images. The red and black images are two color output by an image forming unit 308, thus obtaining an output image 309.

Figure 3:
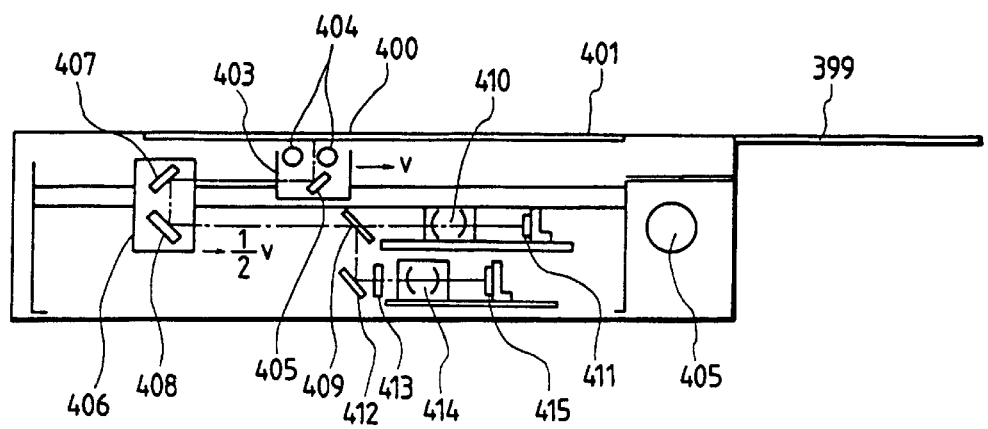
FIGS. 3 and 22 are sectional views showing a structure of a reading unit.

FIG. 3 is a sectional view of the reading unit 302.

The reading unit 302 comprises a transparent original table 401, and a fluorescent lamp unit 403 which incorporates fluorescent lamps 404 and a first mirror 405, and is driven by a driving motor 425 at a velocity v to scan an original 400 (to be referred "subscanning" hereinafter). The reading unit 302 also comprises a mirror unit 406 which includes second mirrors 407 and 408, and is driven by the driving motor 405 at a velocity ½v, so that optical path lengths between the original and CCDs 411 and 415 are kept constant.

A beam splitter 409 splits a light beam from the second mirror 408 into two beams.

One light beam split by the beam splitter 409 is focused on the CCD 411 via an optical system 410, and is converted into an electrical signal. The other light beam propagates through a mirror 412 and a red light filter 413 for allowing only a red light component to pass therethrough, and only a light component from which red light energy is removed is focused on the CCD 415 via an optical system 414 to be converted into an electrical signal.

Figure 4:
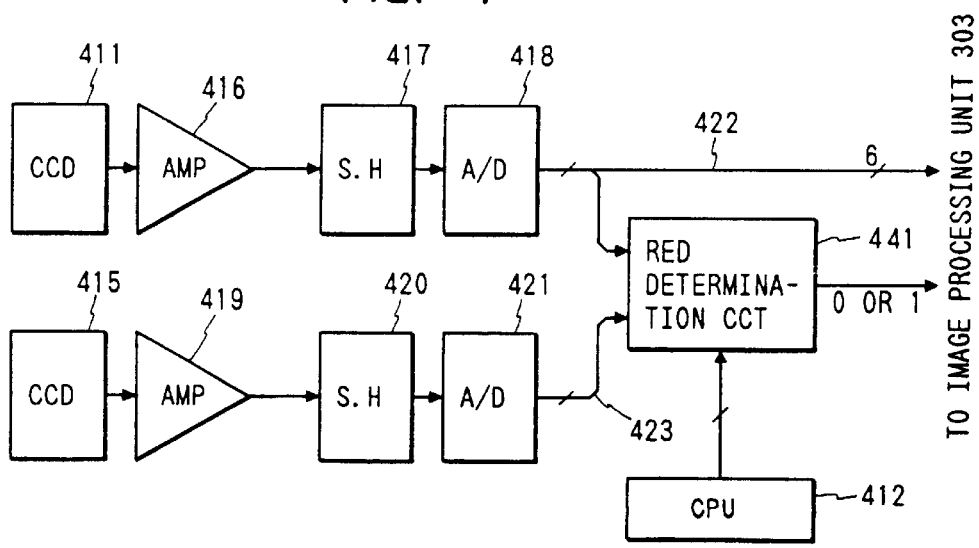
FIG. 4 is a block diagram of the reading unit.

FIG. 4 shows an arrangement of the reading unit 302.

Electrical processing in the reading unit 302 shown in FIG. 4 will be described below.

An output from the CCD 411 without a filter is sent to the image processing unit 303 as a 6-bit video signal 422 in which black=63 and white=0 via an amplifier 416, a sample & hold circuit 417, and an A/D converter 418, and is also sent to a red determination circuit 441.

On the other hand, the CCD 415 with the red filter extracts a signal from which red light energy is removed and sends it as a 6-bit video signal 423 to the red determination circuit 441 via an amplifier 419, a sample & hold circuit 420, and an A/D converter 421 as in the CCD 411.

The red determination circuit 441 sends a 1-bit determination signal indicating whether or not a pixel in an original is red to the image processing unit 303 in accordance with the video signal 422 from the CCD 411, the video signal 423 from the CCD 415, and a determination slice level from a CPU 412.

FIG. 5 shows a processing content of the red determination circuit 441. FIG. 5(a) shows the original 400. A pattern designated by 501 is assumed to be a black character, and a pattern designated by 502 is assumed to be a red character.

Figure 5A:
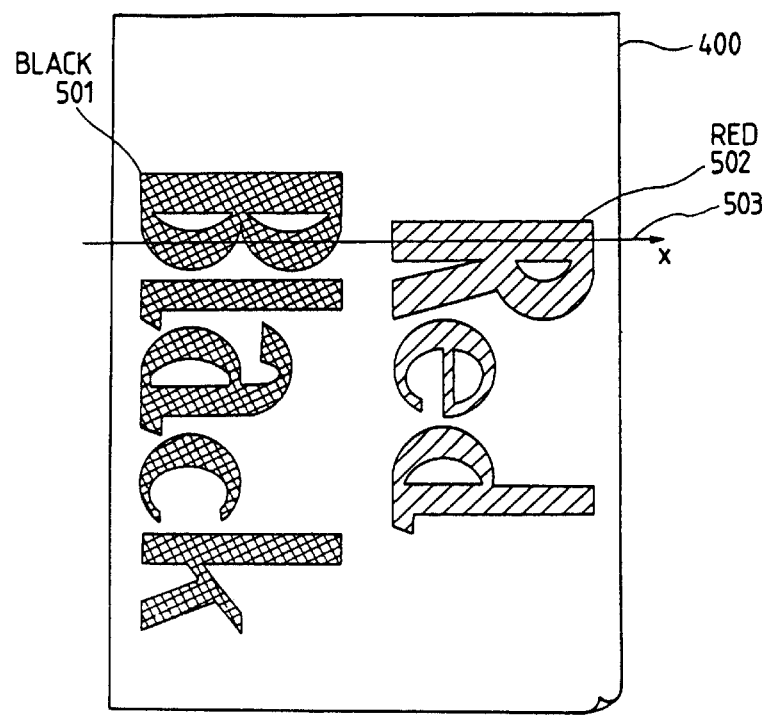
FIGS. 5(a) to 5(e) are charts showing read signals.
Figure 5B:
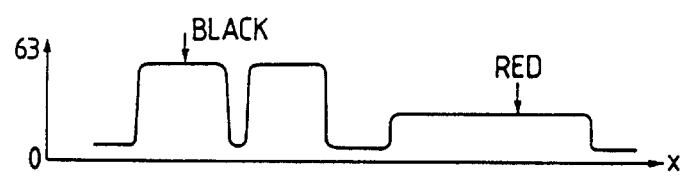

In this case, if a one scanning (to be referred to as "main scanning" hereinafter) line of the CCD at a given time is represented by an X-axis 503, an output from the CCD 411 at this time is expressed as shown in FIG. 5(b). On the other hand, an output from the CCD 415 can be adjusted to have the same signal level of a black character as that in FIG. 5(b) by adjusting a gain and offset of the amplifier 419 and a reference voltage of the A/D converter, as shown in FIG. 5(c).

Figure 5C:
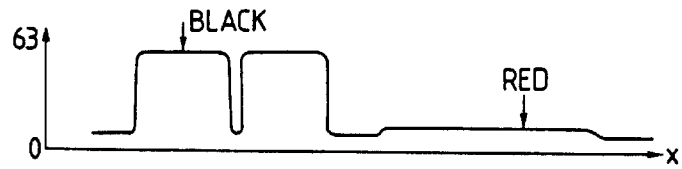
Figure 5D:
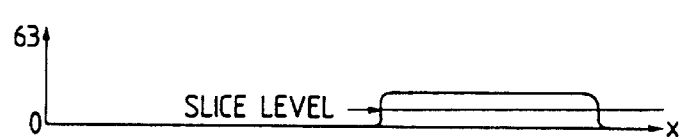
Figure 5E:

FIG. 5(d) shows a signal obtained by subtracting a signal shown in FIG. 5(c) from a signal shown in FIG. 5(b) at the above-mentioned adjusted level.

The signal shown in FIG. 5(d) can be considered to be a signal of only a red character. This signal is discriminated in accordance with a slice level set in advance by the CPU 412, thus obtaining 0 or 1 (0: not red area, 1: red area) binary, i.e., 1-bit information.

This information will be referred to as a red/black bit hereinafter.

Figure 6:
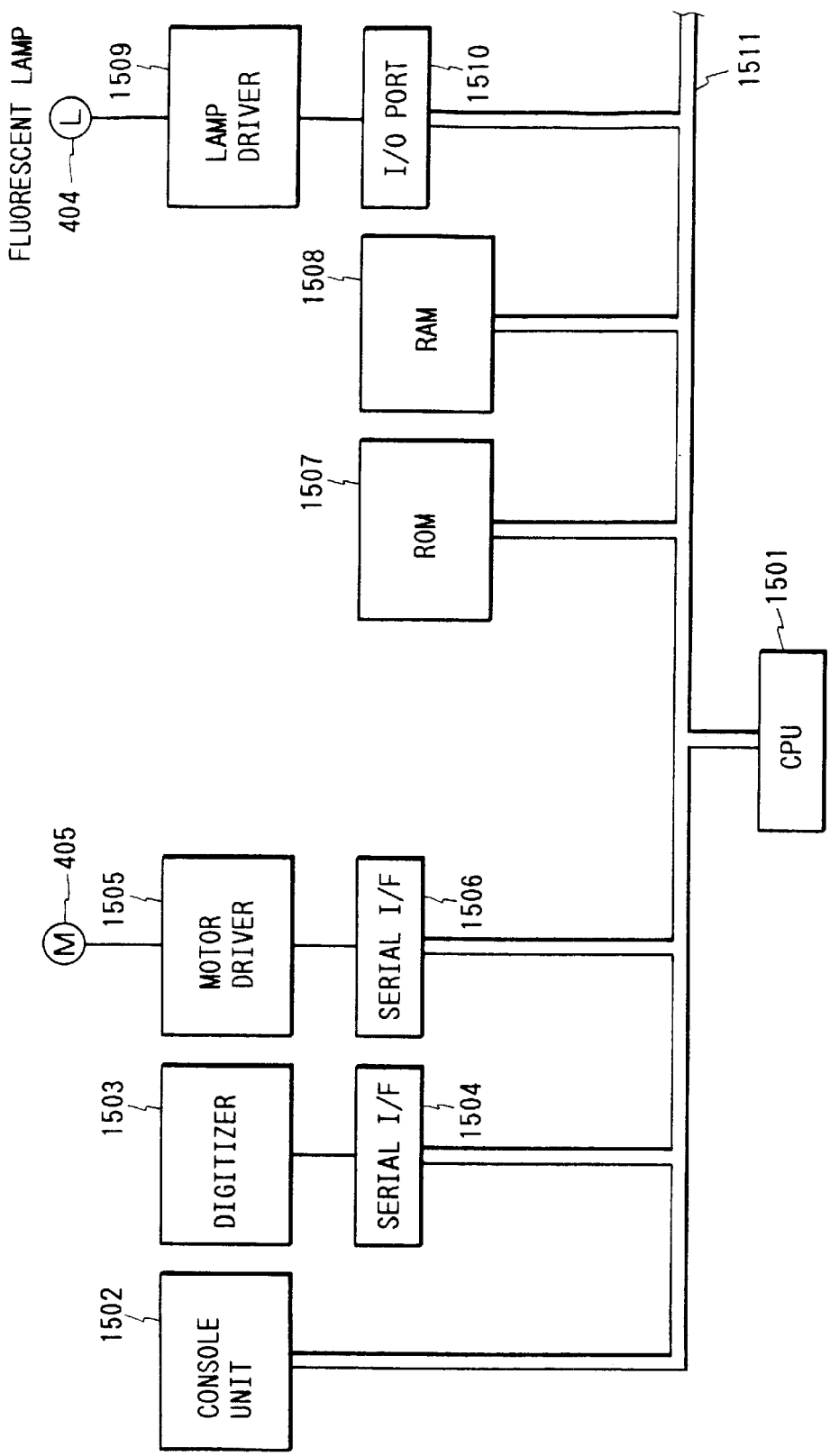
FIGS. 6 and 24 are block diagrams of a control unit.

FIG. 6 is a block diagram of the control unit 320 for determining based on information obtained from an operator whether an image is rotated and output, or is output as it is.

The control unit 320 comprises a CPU 1501, a console unit 1502 used by the operator to input various commands, a digitizer 1503, serial I/Fs 1504 and 1506, a motor driver 1505, the motor 405, a ROM 1507 for storing, e.g., a program, a RAM 1508, an I/O port 1510, a lamp driver 1509, the fluorescent lamps 404, and a CPU bus 1511.

Figures 7, 9:
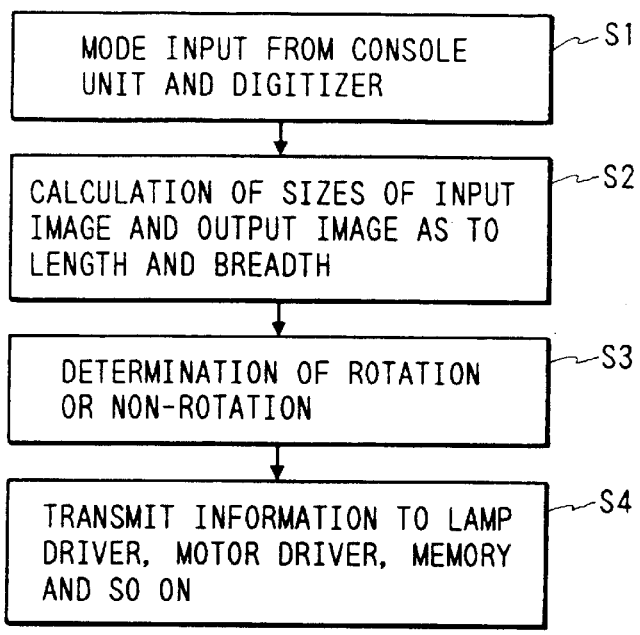
FIG. 7 is a flow chart showing a control sequence.
FIG. 9 is a table showing determination results.
Figure 8A:
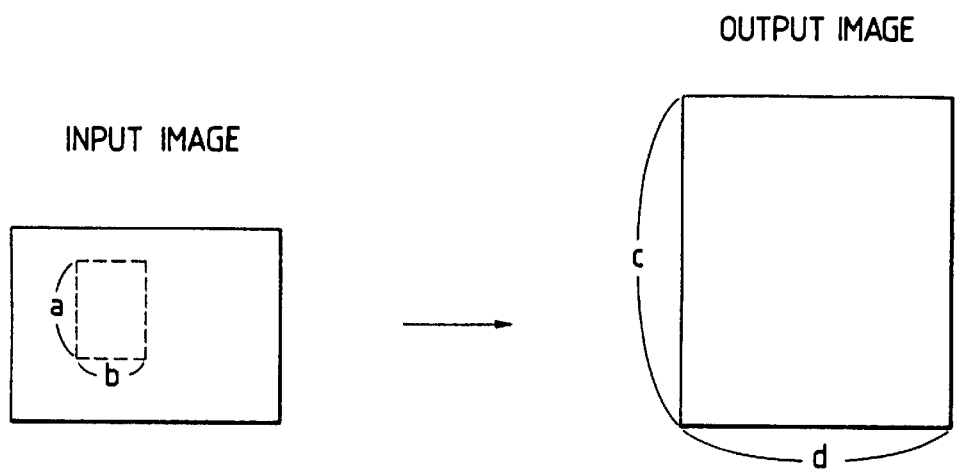
FIGS. 8(a) and 8(b) and FIGS. 25(a) to 26 are views showing processing examples.

The CPU 1501 executes control having an algorithm shown in FIG. 7. In step S1, the operator inputs a command mode using the console unit 1502, the digitizer 1503, or the like. Assume that auto magnification processing of an input image having a length a and a breadth b, as shown in FIG. 8(a), is performed to obtain an output image having a length c and a breadth d. In the prior art, the auto magnification processing is performed to obtain a length of c/a and a breadth of d/b.

Figure 8B:
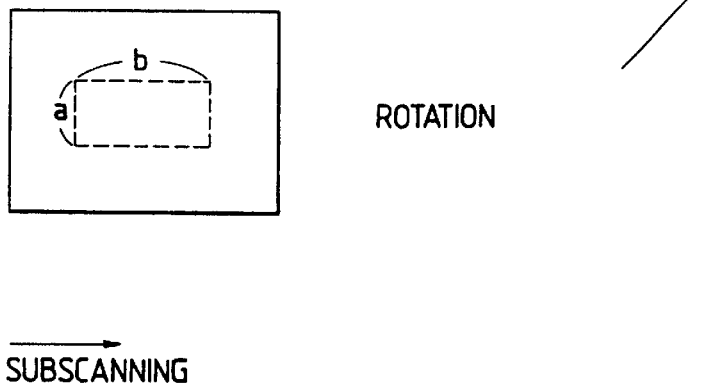

In this embodiment, the CPU 1501 calculates the relationships between the lengths and breadths, i.e., between a and b, and between c and d of the input and output images (S2). As shown in FIG. 8(a), when the input and output images have the same relationship between their lengths and breadths, i.e., in a case of a mode 1 or 2 shown in FIG. 9, an image is not rotated. On the other hand, when the input and output images have different relationships between their lengths and breadths, as shown in FIG. 8(b), i.e., in a case of a mode 3 or 4 in FIG. 9, rotation processing of an image is executed (S3). Furthermore, longitudinal and widthwise magnifications are determined depending on rotation or non-rotation of an image, and the CPU 1501 supplies information to the motor driver 1505 and the lamp driver 1509 so that exposure scanning can be performed at a predetermined scanning velocity and scanning distance (S4). More specifically, since a<b and c>d in FIG. 8(b), a rotation mode is set. Therefore, if the length c of the output image corresponds to the subscanning direction, the motor 405 and the fluorescent lamps 404 are controlled so that the output image has a length c/b times that of the input image.

The CPU 1501 also detects a paper presence/absence sensor of a cassette. When the CPU 1501 detects the absence of paper in the cassette, it changes a paper feed cassette, and controls to rotate an output image with respect to an input image in correspondence with the direction of paper sheets in the selected paper feed cassette. More specifically, assuming that a copying machine has, e.g., A4- and A4R-size cassettes, if A4-size paper sheets are used up during A4-size copying operations, the CPU 1501 switches to the A4R-size cassette to continue the copying operations.

Figure 10B:
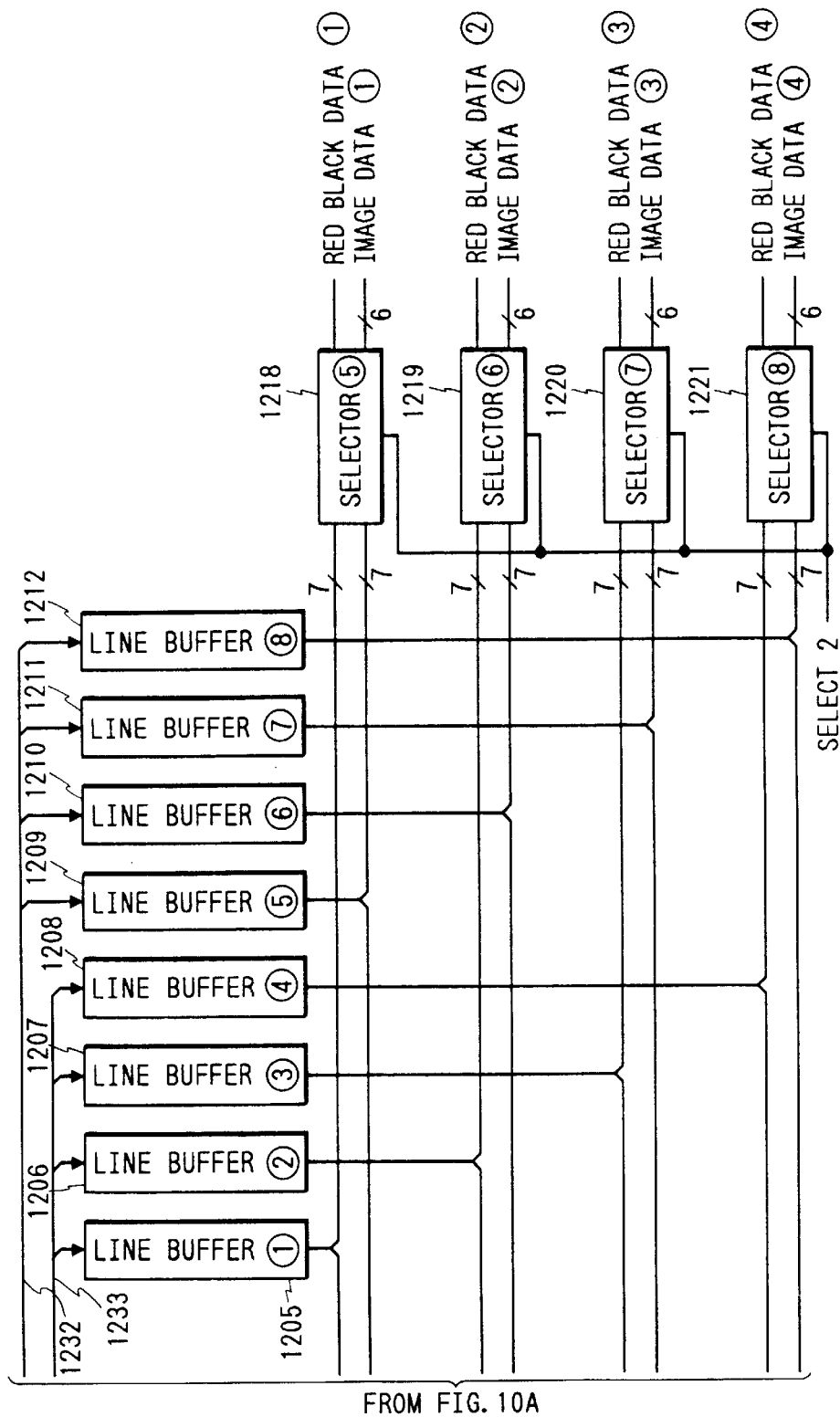
FIGS. 10 and 11 are block diagrams of a block cut out unit.
Figure 11:
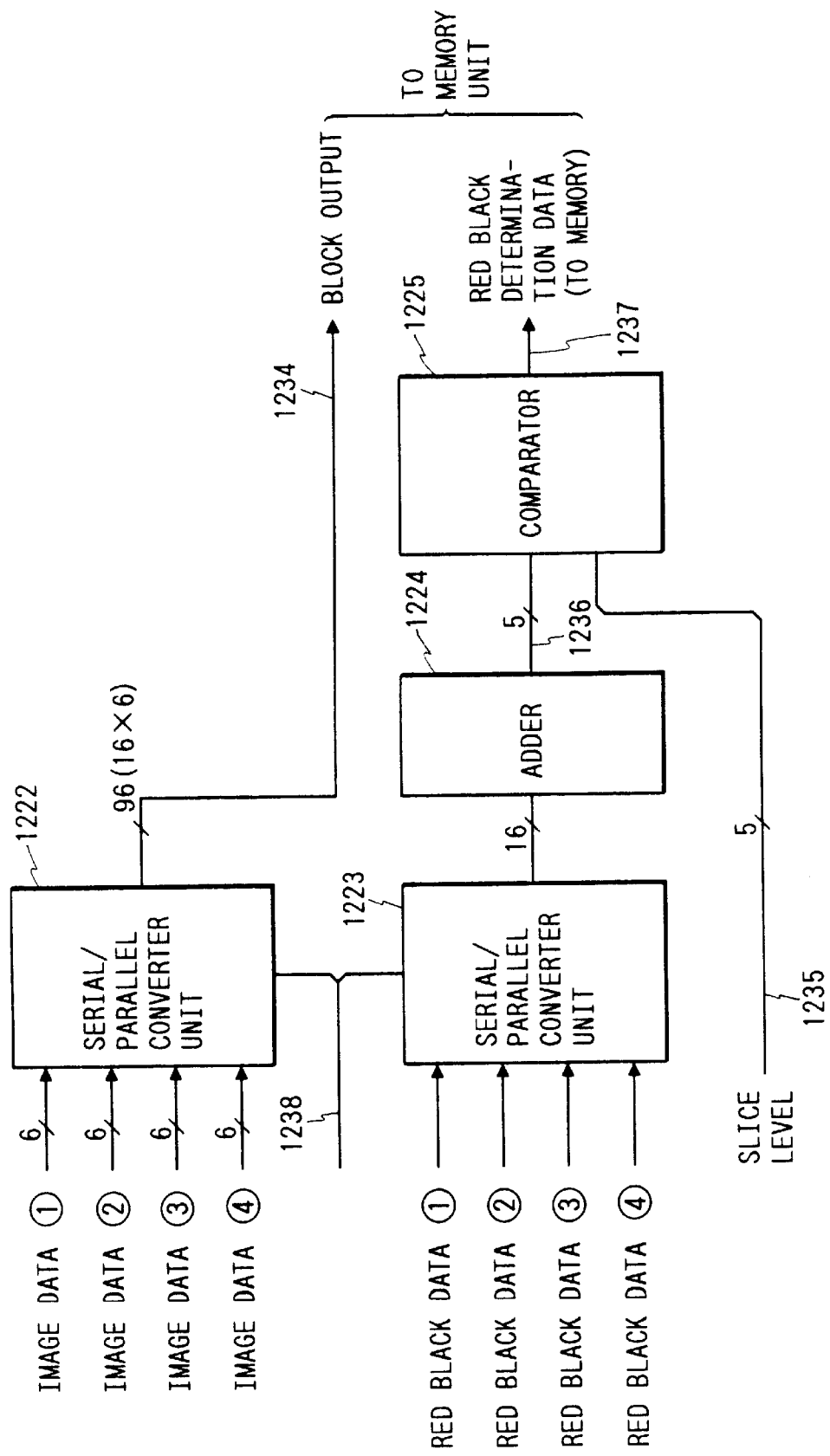

FIGS. 10 and 11 are block diagrams of the block cut out unit 304.

The block cut out unit cuts out an image sent from the image processing unit 303 into 4×4 blocks suitable for quantization.

The block cut out unit comprises a divider 1260 for frequency-dividing a CCD clock ① 1250 under the control of the CPU to generate a write clock 1227, a write address counter 1201 for counting the write clocks 1227, a divider 1261 for frequency-dividing a CCD clock ② 1251 under the control of the CPU to generate a read clock 1228, a read out address counter 1202 for counting the read clocks 1228, a ¼ divider 1203 for frequency-dividing the read clock 1228 by 4, an address multiplexer 1204, line buffers ① to ⑧ 1205 to 1212, a serial/parallel converter unit 1213 for serial/parallel-converting image data 1229 (including one red/black bit), selectors ① to ④ 1214 to 1217, selectors ⑤ to ⑧ 1218 to 1221, a serial/parallel converter unit 1222 for serial/parallel-converting image data ① to ④, a serial/parallel converter unit 1223 for serial/parallel-converting red/black data ① to ④, an adder 1224, and a comparator 1225.

FIGS. 12A and 12B, and FIG. 13 are timing charts of the block cut out unit.

In the timing charts shown in FIGS. 12A and 12B, WVSYNC represents an all write image effective period, CCDVE represents an image effective period of one main scanning line in the CCD, Select1 and Select2 represent signals which are changed in every fifth CCDVE, CCDCLK represents an image clock of the CCD, and D1 to D4 represent image data. The image data D1 to D4 are delayed by one period of the clock CCDCLK in the order of D1→D2→D3→D4. iBCLX corresponds to the write clock 1227 obtained by frequency-dividing the clock CCDCLK by 4. D5 represents data obtained by latching the data D1 to D4 in response to the leading edge of the clock iBCLK. In this case, values d1 to d4 in FIG. 12B are simultaneously latched.

In the timing chart of FIG. 13, D6 to D9 represents image data. A write clock WCLK is obtained by dividing the clock iBCLK by 4 by the ¼ divider 1203. Data D10 is obtained by latching the data D6 to D9 in response to the leading edge of the clock WCLK, and pixels in a 4×4 block are simultaneously latched at the timing of the clock WCLK.

The block cut out unit 304 cuts out image data into 4×4 blocks, and outputs the blocks to the quantizing unit 305, and also performs red/black determination of the 4×4 blocks. These operations will be described in detail below.

An image data write operation is performed as follows.

[1] Image data sent line by line and expressed by 7 bits/pixel (including one red/black bit) is serial/parallel-converted by the serial/parallel converter unit 1213, and the parallel data are sent to the selectors ① to ④ 1214 to 1217. Serial/parallel conversion is performed as indicated by D1 to D5 in FIG. 12B. More specifically, four image data corresponding to four successive pixels input at timings of D1 are simultaneously output at a timing of D5.

[2] The serial/parallel-converted image data are sent to the line buffers ① to ④ 1205 to 1208 or the line buffers ⑤ to ⑧ 1209 to 1212 via the selectors ① to ④ 1214 to 1217.

A control signal for the selectors is the signal Select1. When this signal is "1", write access of the line buffers ① to ④ 1205 to 1208 is performed; when it is "0", write access of the line buffers ⑤ to ⑧ 1209 to 1212 is performed.

Figure 15:
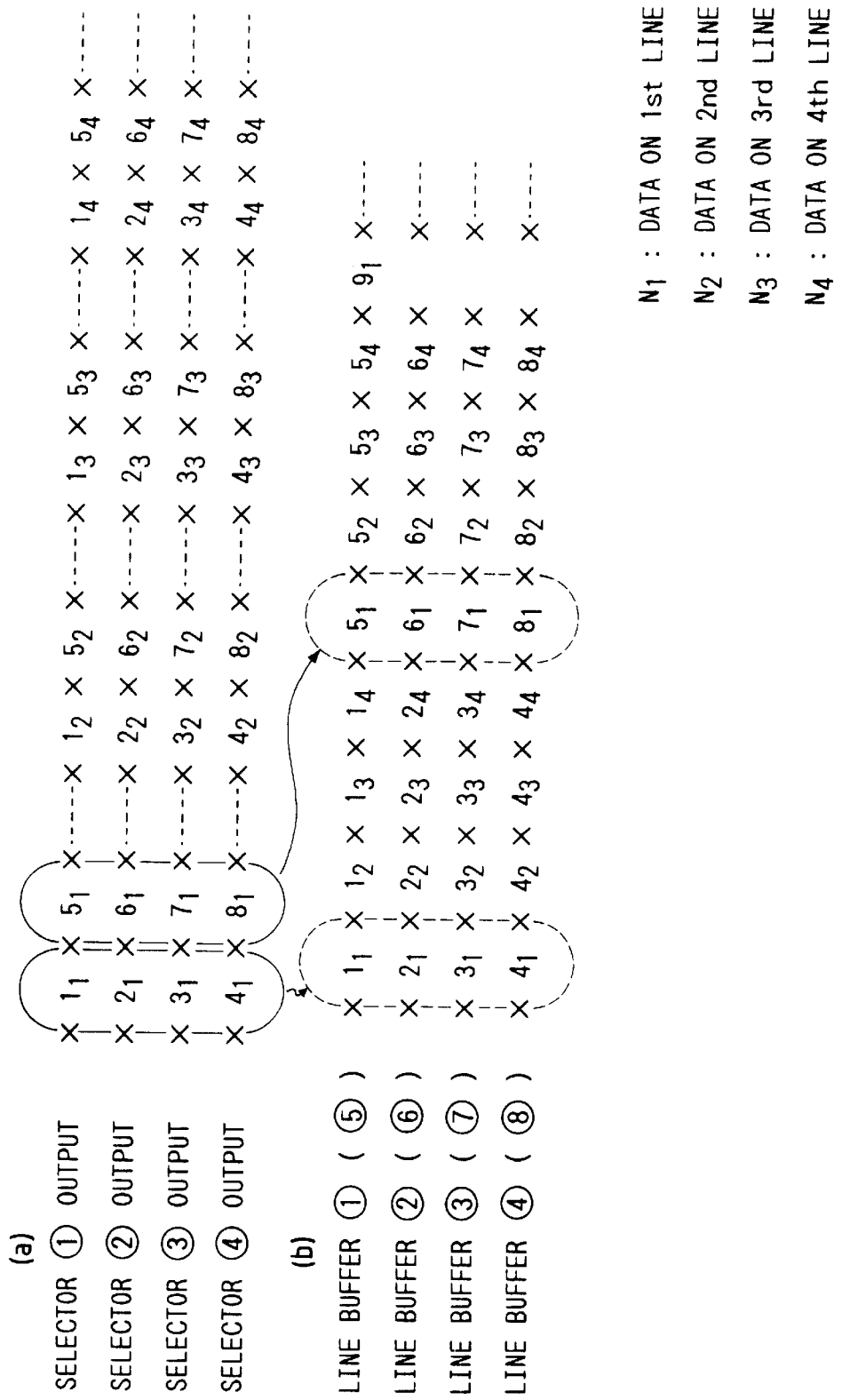
FIGS. 15(a) and 15(b) show block cut-out examples.

[3] As a result, write access of the line buffers is performed as shown in FIGS. 15(a) and 15(b). More specifically, data corresponding to four successive pixels are written at every fifth addresses. This write access is continuously executed for four successive lines. With this system, data having a high-speed video clock (CCDCLK) can be written at a ¼ frequency.

[4] Write address control of the line buffers is performed by the write address counter 1201 and the address multiplexer 1204. A control signal for this multiplexer is also the signal Select1. When this signal is "1", an address on a line 1230 is output onto a line 1233, and an address on a line 1231 is output onto a line 1232; when it is "0", an address on the line 1230 is output onto the line 1232, and an address on the line 1231 is output onto the line 1233.

[5] When an image is to be reduced, the write clocks 1227 are selectively omitted by the divider 1260. For example, in a 50% reduction mode, the CPU performs the following control. That is, as shown in FIG. 16(b), one write clock VCLK1 is omitted for two 100% clocks shown in FIG. 16(a), and read clocks VCLK2 remain the same as 100% clocks shown in FIG. 16(a).

An image data read operation will be described below.

[1] Data at an address indicated by the read out address counter 1202 are read out from the line buffers ① to ④ 1205 to 1208 or the line buffers ⑤ to ⑧ 1209 to 1212 to the selectors ⑤ to ⑧ 1218 to 1221.

[2] The selectors ⑤ to ⑧ 1218 to 1221 select data from the line buffers ① to ④ 1205 to 1208 or the line buffers ⑤ to ⑧ 1209 to 1212. A control signal for the selectors is the signal Select2. When this signal is "0", data from the line buffers ⑤ to ⑧ 1209 to 1212 are selected; when it is "1", data from the line buffers ① to ④ 1205 to 1208 are selected.

The bit format of the selected image data includes 6-bit image data, and one red/black bit.

[3] The 6-bit image data ① to ④ and 1-bit red/black data ① to ④ are serial/parallel-converted by the serial/parallel converter units 1222 and 1223, thus outputting a 4×4 block. Serial/parallel conversion is performed, as shown in FIG. 13. More specifically, 16 pixels of the image data input at timings of D6 are simultaneously at a timing of D10.

[4] When an image is to be enlarged, contrary to a reduction mode, the read clocks 1228 are selectively omitted by the divider 1261. For example, in a 200% enlargement mode, the CPU performs the following control. That is, as shown in FIG. 16(c), write clocks VCLK1 remain the same as 100% clocks shown in FIG. 16(c), and one clock VCLK2 is omitted for two 100% clocks shown in FIG. 16(a).

Meanwhile, red/black determination of a 4×4 block is performed in the following order by an arrangement shown in FIG. 17.

[1] The red/black data ① to ④ of the image data are serial/parallel-converted by the arrangements shown in FIGS. 10 and 11, thereby forming a 4×4 block shown in FIG. 14.

[2] "1"s in the 4×4 block are added by the adder 1224, and the addition result is compared with a predetermined slice level 1235 by the comparator 1225, thereby obtaining 1-bit red/black data 1237 for each 4×4 block. More specifically, when the output from the adder 1224 is larger than the slice level 1235, the comparator 1225 outputs "1" as red information.

Figure 17:
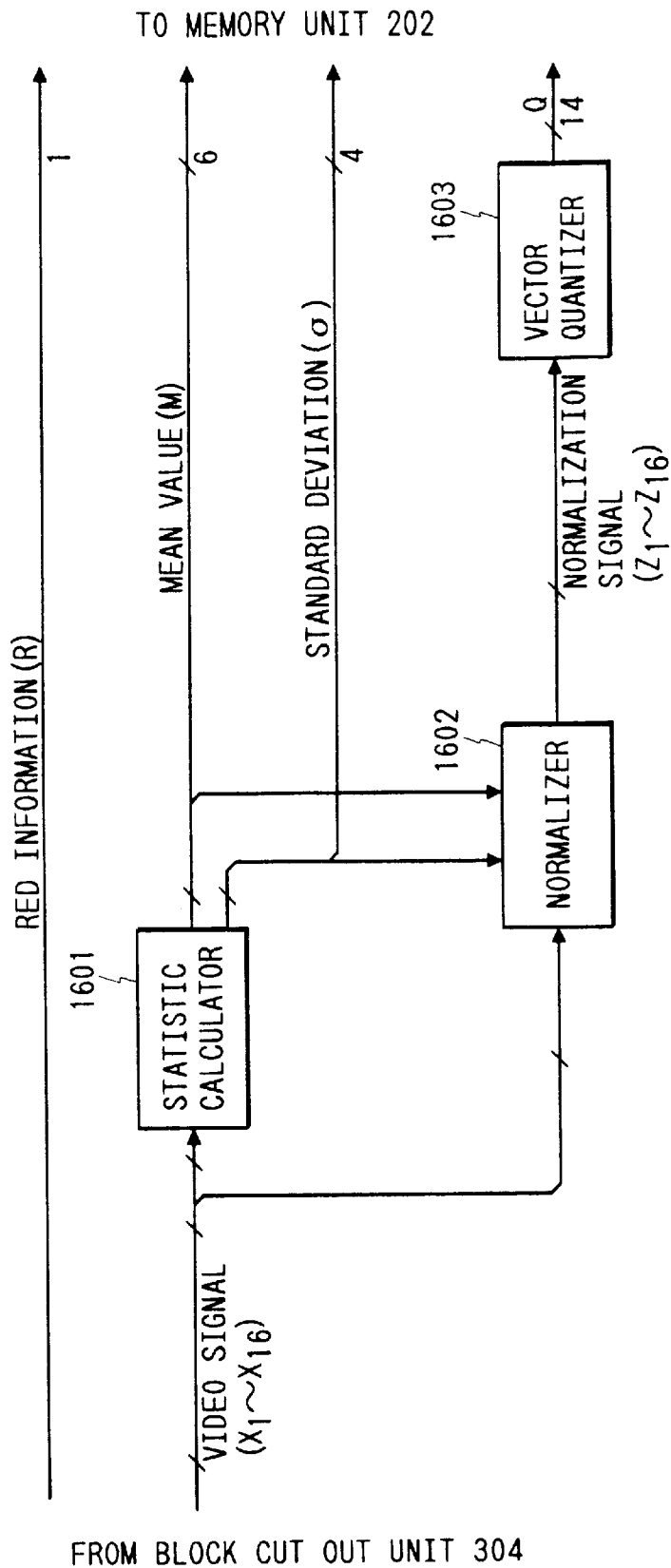
FIG. 17 is a block diagram of a quantizing circuit.

FIG. 17 is a block diagram of the quantizing unit 305.

1-bit red information for each block sent from the block cut out unit 304 is directly supplied to the memory unit 202. On the other hand, a 6-bit mean value M and a 4-bit standard deviation σ of video signals $X_1$ to $X_{16}$ in one block are calculated by a statistic calculator 1601 as follows:

$$\begin{cases} M = \dfrac{1}{16}\sum_{i=1}^{16} X_i \\ \sigma = \left(\dfrac{1}{16}\sum_{i=1}^{16} X_i^2 - M^2\right)^{1/2} \end{cases}$$

A normalizer 1602 normalizes the signals $X_1$ to $X_{16}$ using M and σ by the following equation:

$Z_i = (X_i - m)/\sigma$ ($i$=1 to 16)

The normalized $Z_1$ to $Z_{16}$ are quantized to a 14-bit code Q by a vector quantizer 1603.

M (6 bits) is DC information in a block, σ (4 bits) is AC information, and Q (14 bits) is phase information. The DC information, the AC information, and the phase information are sent to the memory unit 202 together with R as a total of 25-bit data.

Figure 18:
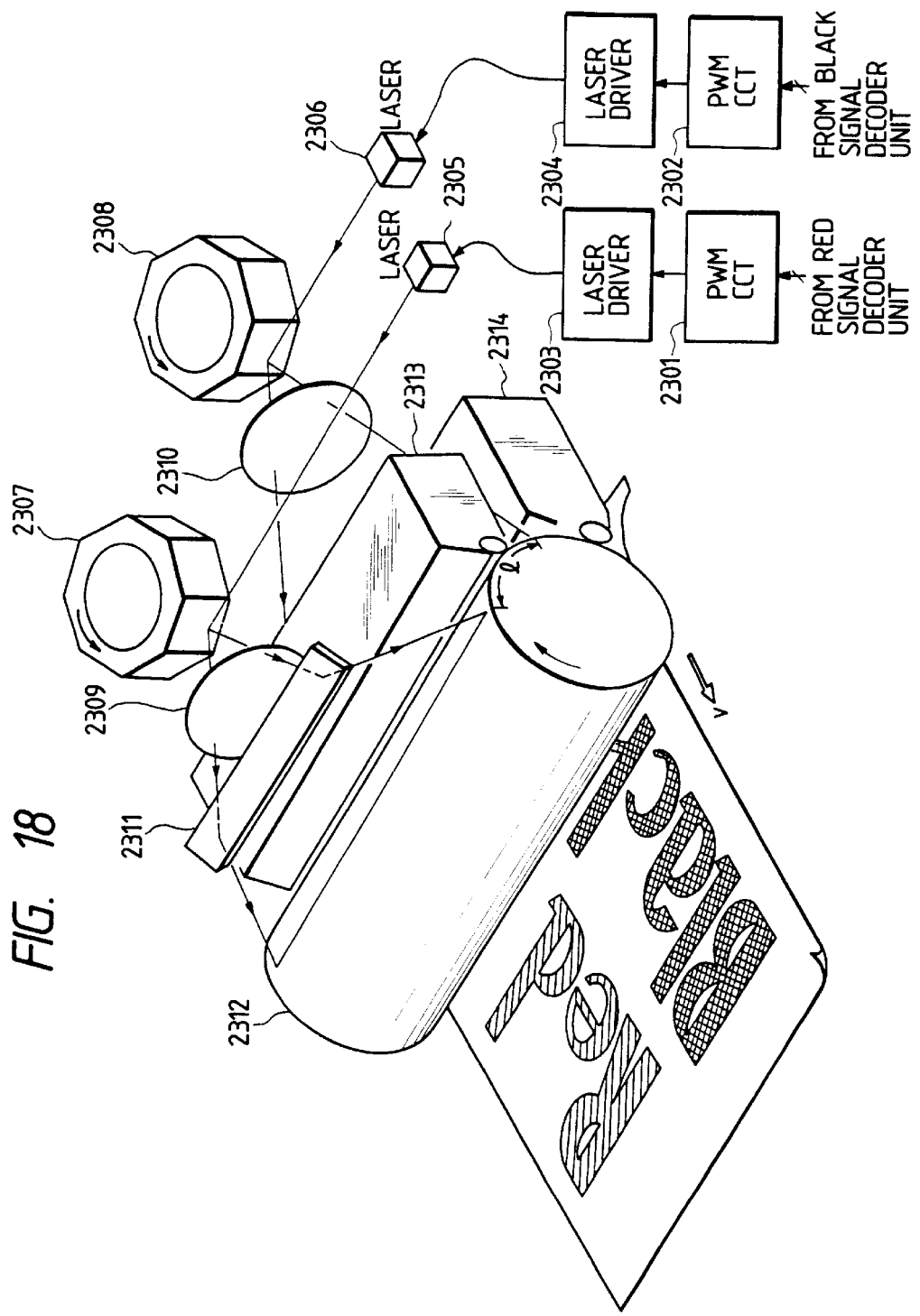
FIG. 18 is a perspective view showing a structure of a printer unit.

FIG. 18 shows a structure of the image forming unit 308.

In FIG. 18, the image forming unit 308 comprises a pulse width modulation (PWM) circuit 2301 for a red laser, a PWM circuit 2302 for a black laser, a laser driver 2303 for the red laser, a laser driver 2304 for the black laser, a red semiconductor laser 2305, a black semiconductor laser 2306, a red scanner 2307, a black scanner 2308, a red f-θ lens 2309, a black f-θ lens 2310, a reflection mirror 2311, a photosensitive drum 2312, a red developing unit 2313, and a black developing unit 2314. In addition to these components, various known mechanisms such as a cleaning mechanism for the photosensitive drum 2312, a conveying mechanism of a recording medium, and the like are arranged.

Operations for forming images on the photosensitive drum by the red and black lasers in FIG. 18 will be described below.

[1] Red Laser

A red video signal sent from a red signal decoder is D/A-converted and PWM-modulated by the red-laser PWM circuit 2301.

The obtained pulse signal is converted by the red-laser driver 2303 into a signal for driving the red semiconductor laser 2305.

A laser beam emitted from the red semiconductor laser 2305 forms a spot-like focal point on the photosensitive drum 2312 via the red scanner 2307, the f-θ lens 2309, and the reflection mirror 2311.

[2] Black Laser

On the other hand, a black video signal sent from a black signal decoder is D/A-converted and PWM-modulated by the black-laser PWM circuit 2302.

The obtained pulse signal is converted by the black-laser driver 2304 into a signal for driving the black semiconductor laser 2306.

A laser beam emitted from the black semiconductor laser 2306 forms a spot-like focal point on the photosensitive drum 2312 via the black scanner 2308 and the f-θ lens 2310.

Since the black laser beam focal point and the red laser beam focal point are spatially offset from each other, if the spatial offset is represented by l and a process speed is represented by v, video effective periods of the two colors have a time offset (l/v), as shown in FIG. 18. This corresponds to the fact that a black video signal is input l/v later after a red video signal is input in a video signal input unit, and a radiation distance l is present between two beams on the photosensitive drum, as shown in FIG. 18. As described above, red and black data are simultaneously written. After radiation of the laser beams, a portion irradiated with the red laser is developed by the red developing unit, and a portion irradiated with the black laser is developed by the black developing unit (FIG. 18 illustrates that "Red" is developed by the red developing unit, and "Black" is developed by the black developing unit). The obtained toner image is transferred from the photosensitive drum 2312 onto a recording medium, and the toner image is fixed on the recording medium, thus obtaining a copy.

Figure 20:
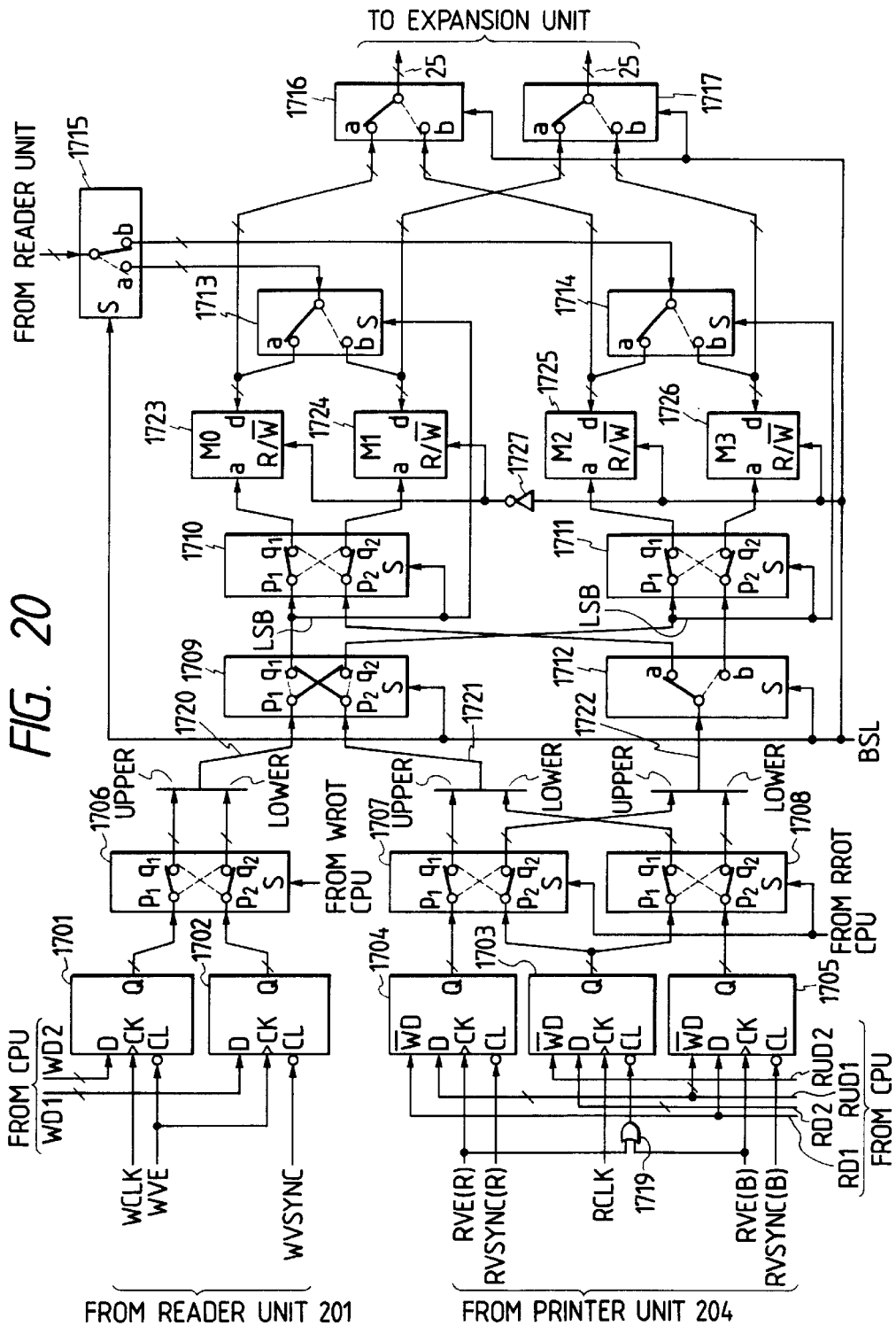
FIG. 20 is a block diagram of a memory unit.

FIG. 20 shows an arrangement of the memory unit 202.

The memory unit 202 has a capacity capable of storing an image signal for at least one frame, and fetches a total of 25-bit encoded image signal sent from the quantizing unit 305 of the reader 201. The unit 202 writes the fetched image signal in a memory unit, and at the same time, outputs two kinds of signals, i.e., red and black signals read out from the memory element to the printer unit 204. At this time, the memory unit 202 performs processing, e.g., rotation of an image in accordance with an instruction from the CPU 1501.

The memory unit 202 comprises write address up counters 1701 and 1702, read address up/down counters 1703, 1704, and 1705, exchangers 1706, 1707, 1708, 1709, 1710, and 1711, selectors 1712, 1713, 1714, 1715, 1716, and 1717, an OR gate 1719, and memory elements 1723, 1724, 1725, and 1726.

Each of the exchangers 1706, 1707, 1708, 1709, 1710, and 1711 selects $p_1 \rightarrow q_1$ and $p_2 \rightarrow q_2$ when S=0, and selects $p_1 \rightarrow q_2$ and $p_2 \rightarrow q_1$ when S=1. Each of the selectors 1712, 1713, 1714, 1715, 1716, and 1717 selects a terminal a when S=1, and selects a terminal b when S=0.

The counter 1701 serves as a write main scanning address counter. The counter 1701 counts up in response to write clocks (WCLK), and is cleared when a write main scanning signal period (WVE) becomes "0".

The counter 1702 serves as a write subscanning address counter. The counter 1702 counts up in response to signals WVE, and is cleared when a write subscanning signal period (WVSYNC) becomes "0".

The counters 1701 and 1702 receive synchronization signals (WCLK, WVE, and WVSYNC) from the reader 201 and counter preset data ($WD_1$ and $WD_2$) from the CPU, and respectively generate write main scanning and subscanning addresses. These addresses are sent to the exchanger 1706.

The counters 1703, 1704, and 1705 receive synchronization signals (RCLK, RVE(R), RVSYNC(R), RVE(B), RVSYN(R)) from the printer unit 204, and counter preset data ($RD_1$ and $RD_2$) and counter up/down selection signals ($RnD_1$ and $RnD_2$) from the CPU, and respectively generate a read main scanning address common to red and black images, a read subscanning address for a red image, and a read subscanning address for a black image. These addresses are sent to the exchangers 1707 and 1708.

The exchanger 1706 exchanges main scanning and subscanning addresses when data is written in a memory. More specifically, when a signal WROT from the CPU is "0", the exchanger 1706 generates a read address 1720, so that the subscanning address corresponds to an upper address, and the main scanning address corresponds to a lower address. When WROT=1, the exchanger 1706 forms the read address 1720 so that the main scanning address corresponds to an upper address, and the subscanning address corresponds to a lower address.

Figures 21, 22:
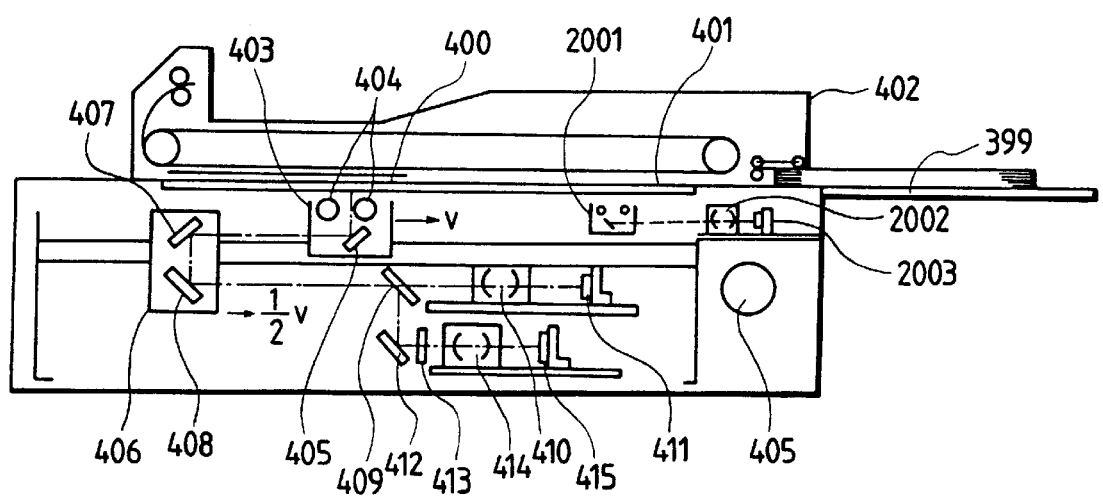
FIG. 21 is a table showing control signals.

Similarly, the exchangers 1707 and 1708 exchange main scanning and subscanning addresses when data is read out from a memory. More specifically, when a signal RROT from the CPU is "0", the exchangers 1707 and 1708 respectively form red and black image read addresses 1721 and 1722 so that both red and black image read subscanning addresses correspond to upper addresses, and the main scanning address corresponds to a lower address. More specifically, the signals WROT and RROT are controlled, as shown in FIG. 21.

The exchanger 1709 and the selector 1712 switch the read adresses 1720, 1721, and 1722 in accordance with a control signal (BSL) indicating that data are written in memory elements $M_0$ and $M_1$ and are read out from memory elements $M_2$ and $M_3$, or vice versa.

The exchanger 1710 is switched depending on whether a lower one bit of an address to be input to $p_1$ is 0 or 1 in order to determine an odd- or even-numbered block line, and to switch between $M_0$ and $M_1$ and between $M_2$ and $M_3$. More specifically, the exchanger 1710 is switched for each block line.

The selectors 1713 and 1714 are used to select the memory elements when data is written. The selectors 1716 and 1717 are used when data is read out, and their outputs are sent to the corresponding expansion units as red and black image signals, respectively. The selector 1715 distributes an image signal from the reader to the memory element $M_0$ and $M_1$ or to the memory elements $M_2$ and $M_3$.

Note that a rotation or non-rotation mode is discussed about a case wherein rotation or non-rotation processing is automatically performed in accordance with the shapes of an original image and a recording medium. In this case, the rotation mode can be easily canceled in accordance with setting at the console unit using the signals WROT and RROT.

Figure 19:
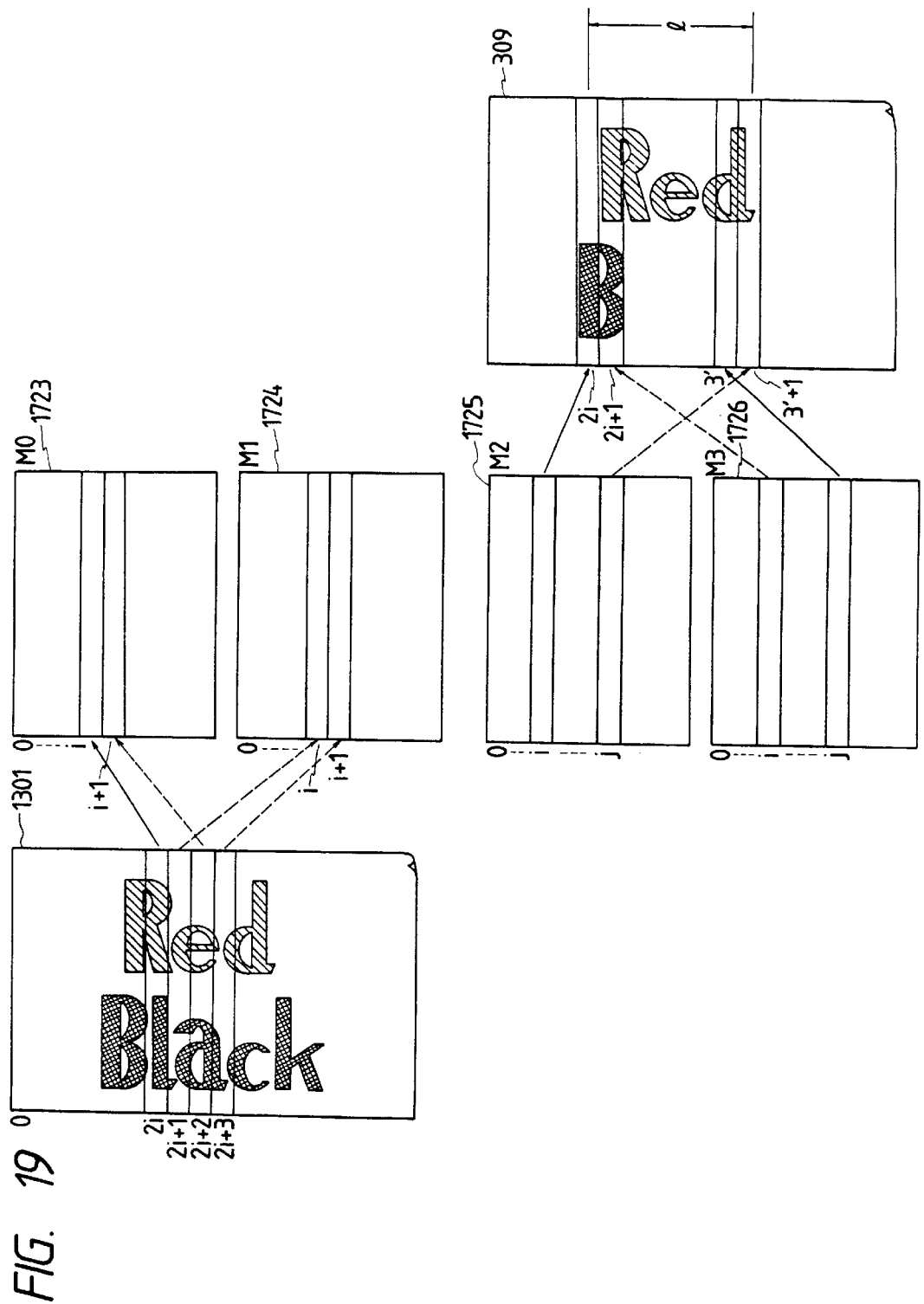
FIG. 19 shows a memory operation.

FIG. 19 shows read and write states of the image memory. The memory elements are divided into four banks 1723 ($M_0$), 1724 ($M_1$), 1725 ($M_2$), and 1726 ($M_3$), and can be independently addressed and switched. Read access of the elements $M_2$ and $M_3$ can be performed during write access of the elements $M_0$ and $M_1$, and vice versa, thus improving copy efficiency when copies are obtained from a plurality of originals.

Another embodiment will be described below. In this embodiment, auto magnification processing of various original sizes is performed using an apparatus comprising an automatic document feeder (ADF). In this case, assume that auto magnification processing of A3- and A4-size mixed originals is performed. This embodiment is almost the same as the embodiment described above, and only different portions will be described below. Differences are that the ADF is arranged, and that an original size is detected for each original, and whether or not an output image is rotated with respect to an input image is determined based on the detection result.

FIG. 22 is a sectional view of a reading unit. FIG. 22 is almost the same as FIG. 3. Differences are components 402 and 2001 to 2003.

Figure 23A:
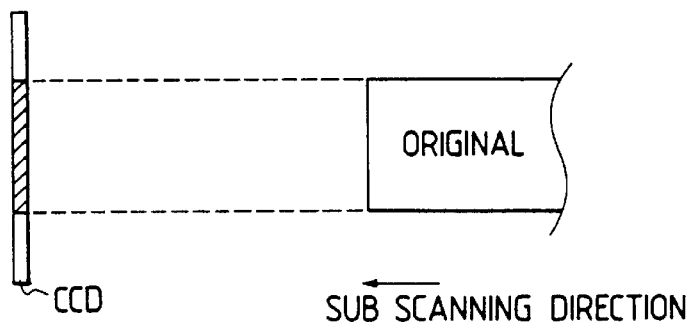
FIGS. 23(a) and 23(b) are views showing original detection examples.

An ADF 402 sequentially feeds originals placed on an original table 399. A unit 2001 including fluorescent lamps and a mirror, a focusing lens 2002, and a CCD 2003 constitute a means for detecting the size of an original. With this apparatus, a main scanning size is recognized depending on a portion where outputs from the CCD 2003 exceed a threshold level. That is, the size can be obtained by calculating the size of a hatched portion in FIG. 23(a) by the CPU.

Figure 23B:
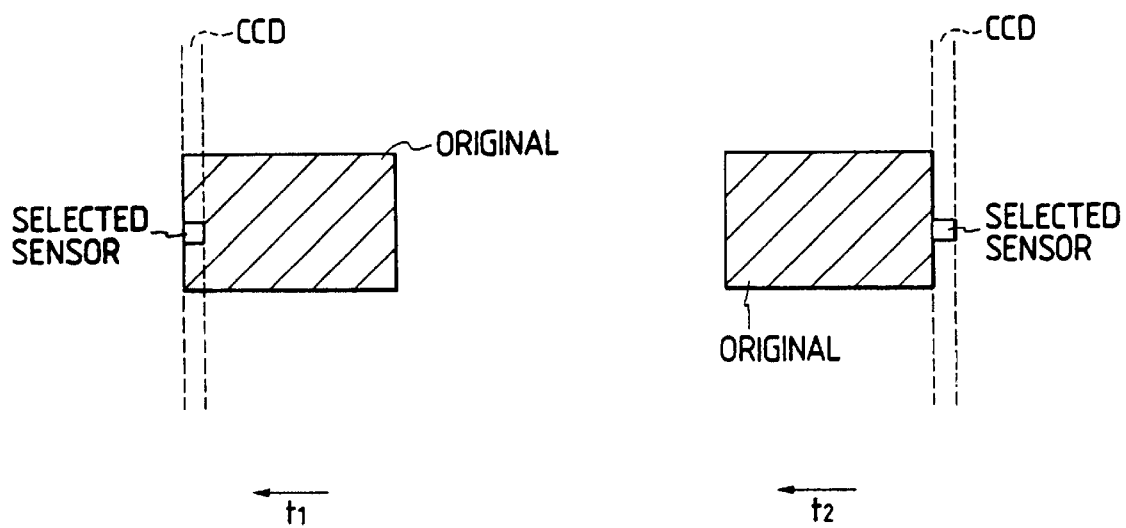

On the other hand, a subscanning size can be obtained by measuring an original crossing time using a sensor selected from the CCD 2003, as shown in FIG. 23(b). For example, when a paper sheet is fed at a velocity of $v_0$ in the subscanning direction, the subscanning size can be obtained by calculating ($v_0/(t_2-t_1)$).

Figure 24:
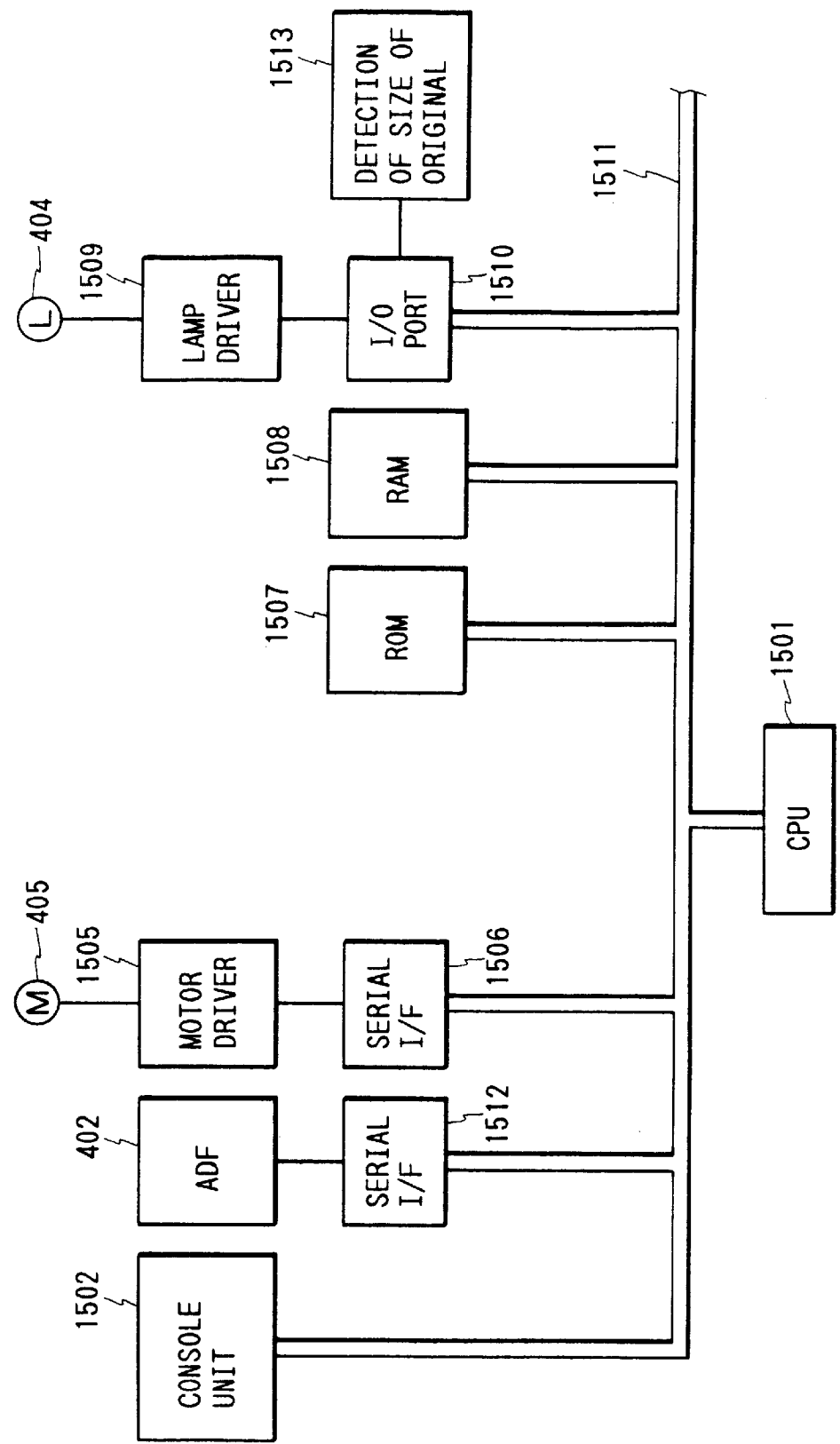

FIG. 24 is a diagram for explaining a control unit, and corresponds to FIG. 6. Differences from FIG. 6 are that portions (402, 1512) associated with the ADF 402, and an original size detector 1513 are added, and portions associated with the digitizer (1503, 1504) are omitted.

Control in this case also operates according to the algorithm shown in FIG. 7. Steps S1 and S2 are slightly different from those in FIG. 7. That is, whether or not a rotation mode is set is determined in accordance with a mode set at a console unit, and original size detection information. More specifically, when an original size is an A3 size, an image is output in a non-rotation mode, and when it is an A4 size, the image is output in a rotation mode.

Figure 25B:
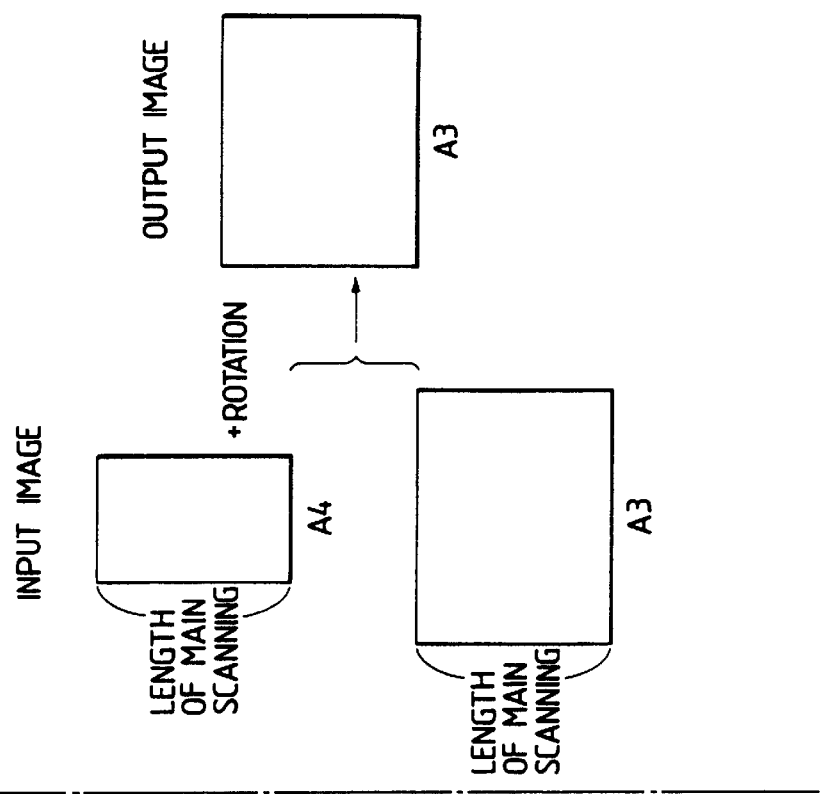
Figure 25A:
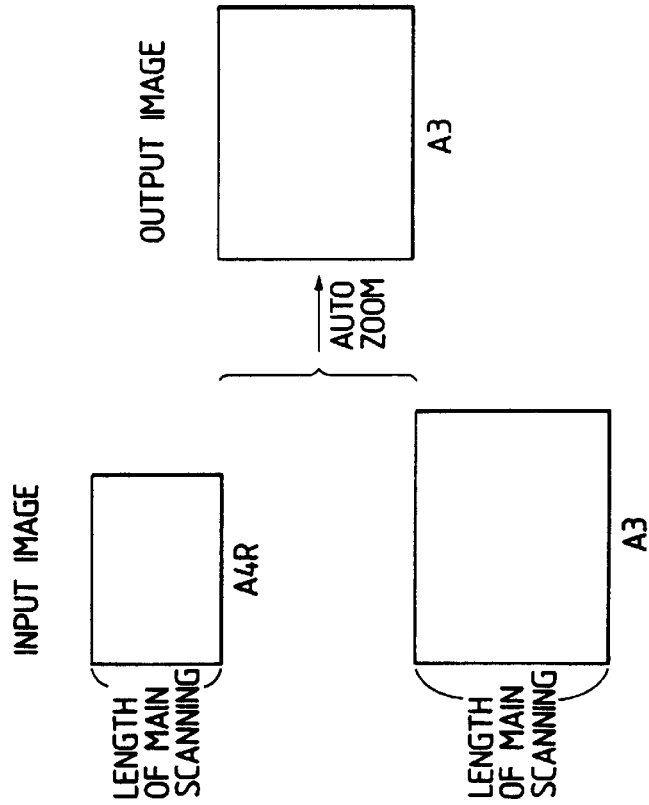

When auto magnification processing of A3 and A4 mixed originals is to be performed in a conventional system, A4 originals must be set in the ADF in correspondence to a conveying direction of A3-size recording media, as shown in FIG. 25(a). However, according to this embodiment, A4 originals can be placed regardless to a conveying direction of the recording media, as shown in FIG. 25(b).

According to the arrangements of the embodiments described above, the following effects ① to ③ can be obtained.

Figure 26:
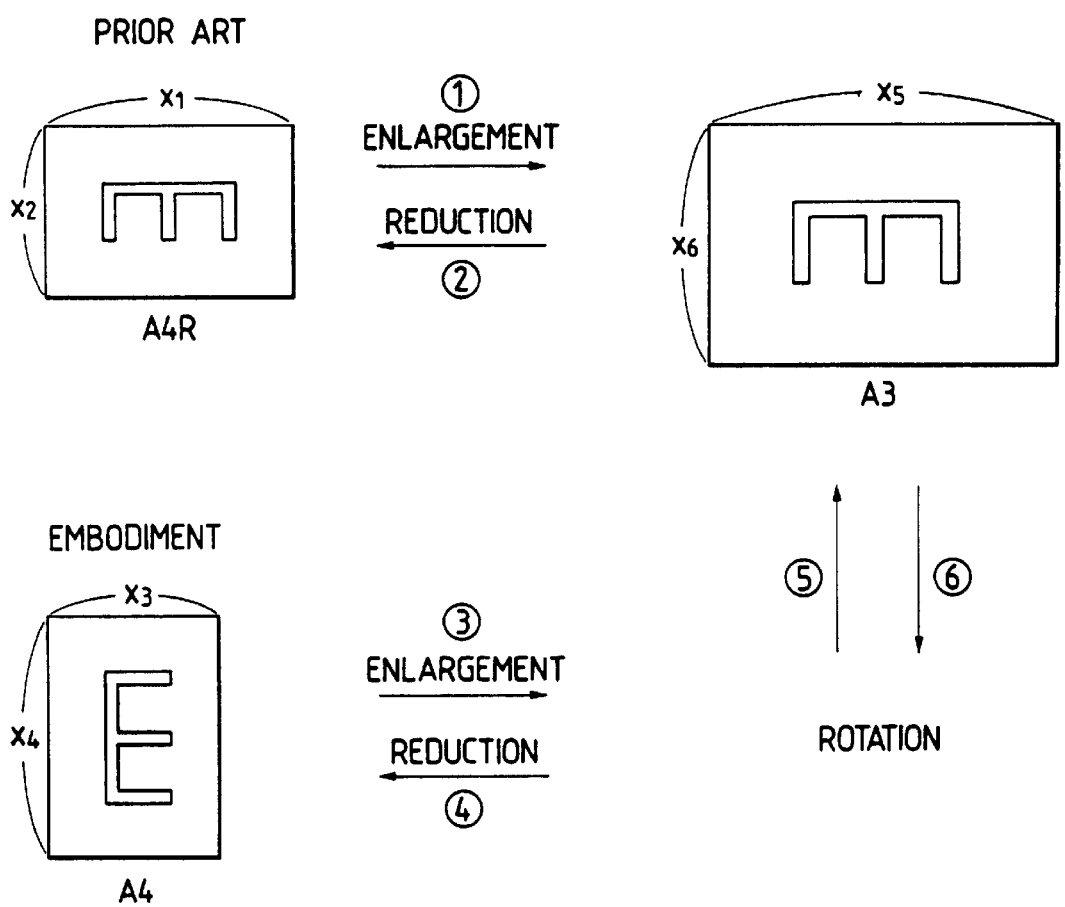

① Improved Throughput (1) When enlargement ① in FIG. 26 is performed in ③→⑤, since a time required for scanning an original can be shorted, a throughput can be improved.

(2) When reduction ② in FIG. 26 is performed in ⑤→④, the subscanning direction of an output original can be shortened, and a throughput can be improved.

② Improved Operability

Since main scanning and subscanning addresses are automatically reversed in accordance with the lengths and breadths of input and output images to output an image, an operation error of an operator can be eliminated, thus improving operability.

③ When originals having various original sizes are coped with in an auto magnification mode using an ADF, an RDF, or the like, a skew of originals caused by a difference in main scanning length can be prevented.

As described above, in an image processing apparatus comprising a reader unit for inputting an image signal, and a printer unit for recording an image on a recording medium on the basis of the image signal, the image signal input from the reader unit is subjected to rotation processing, the processed image signal is supplied to the printer unit, and the rotation processing is controlled in accordance with the shape of an image expressed by the image signal input from the reader unit and the shape of a recording medium subjected to image recording by the printer unit. Therefore, an operator can satisfactorily perform image recording regardless of the shapes, convey states, and the like of an original and a recording medium.

The arrangements of the preferred embodiments of the present invention have been described above. However, the present invention is not limited to these arrangements, and various changes and modifications may be made within the scope of claims.

What is claimed is:

1. An image forming apparatus comprising:

input means for inputting an image signal;

recording means for recording an image on a recording medium obtained from one of a plurality of sheet feeding units on the basis of the image signal input by said input means;

rotating means for performing rotation processing on the image signal input by said input means, and supplying the processed image signal to said recording means;

control means for controlling an operation of said rotating means; and setting means for setting one of either a first mode or a second mode, wherein, when the first mode is set, in a case where none of the plurality of sheet feeding units contains the recording medium selected to record the image on the basis of the image signal so that the image may be recorded thereon without rotating the image, said control means causes said rotating means to perform rotation on the image signal and causes said recording means to record the image on the recording medium which has the same size, but which is set in a different orientation in another sheet feeding unit than the selected recording medium, wherein, when the second mode is set, in a case where none of the plurality of sheet feeding units contains the recording medium selected to record the image on the basis of the image signal so that the image may be recorded thereon without rotating the image, said control means prohibits both said rotation means to perform rotation processing on the image signal and said recording means to record the image, regardless of whether or not the recording medium is present, and wherein, in a case where at least one of the plurality of sheet feeding units contains the recording medium selected to record the image on the basis of the image signal so that the image may be recorded thereon without rotating the image, said recording means records the image on the recording medium regardless of whether the first mode or the second mode is set.

2. An apparatus according to claim 1, wherein at least two of the plurality of sheet feeding units contain the same size recording medium in different orientations of each other, wherein said recording means selects one of the plurality of sheet feeding units and records the image on the recording medium in accordance with a size and an orientation of the selected sheet feeding unit.

3. An apparatus according to claim 1, wherein in a case where a selected sheet feeding unit, capable of containing recording medium on which the image may be recorded without rotating the image, is empty, said control means causes said rotating means to perform rotating processing, and said recording means records the image on the recording medium obtained from another sheet feeding unit containing recording medium having the same size as, but set in a different orientation than, that stored in the selected sheet feeding unit.

4. An apparatus according to claim 1, further comprising a reader for reading an image on a document and generating the image signal based on the image, wherein said input means inputs the image signal from said reader.

5. An apparatus according to claim 4, wherein said reader reads the image on the documents which are fed successively from an auto document feeder.

6. An apparatus according to claim 1, wherein said rotating means performs rotation of the image by controlling memory access to a memory in which the image signal is stored.

7. An apparatus according to claim 6, wherein said rotating means controls write access in a case of storing the image signal into the memory.

8. An apparatus according to claim 6, wherein said rotating means controls read access in a case of reading out the image signal stored in the memory.

9. An apparatus according to claim 6, wherein the memory stores the image signal together with control information which indicates a process in the case of recording the image based on the image signal by said recording means, and said rotating means controls memory access relating to the image signal and to the control information.

10. An apparatus according to claim 9, wherein the control information indicates a recording color in the case of recording the image by said recording means.

11. An image processing method comprising:

an input step of inputting an image signal;

a rotating step of performing rotation processing on the image signal input in said input step;

a recording step of recording an image on a recording medium obtained from one of a plurality of sheet feeding units on the basis of the image signal;

controlling an operation of said rotating step; and setting one of either a first mode or a second mode, wherein when the first mode is set, in a case where none of the plurality of sheet feeding units contains the recording medium selected to record the image on the basis of the image signal so that the image may be recorded thereon without rotating the image, said control step causes said rotating step to perform rotation on the image signal and causes said recording step to record the image on the recording medium which has the same size as, but which is set in the different orientation in another sheet feeding unit than the selected recording medium, wherein, when the second mode is set, in a case where none of the plurality of sheet feeding units contains the recording medium selected to record the image on the basis of the image signal so that the image may be recorded thereon without rotating the image, said control step prohibits both said rotation step to perform rotation processing on the image signal and said recording step to record the image, regardless of whether or not the recording medium is present, and wherein, in a case where at least one of the plurality of sheet feeding units contains the recording medium selected to record the image on the basis of the image signal so that the image may be recorded thereon without rotating the image, the image is recorded on the recording medium in said recording step regardless of whether the first mode or the second mode is set.

12. A method according to claim 11, wherein at least two of the plurality of sheet feeding units contain the same size recording medium in different orientations of each other, wherein said recording step selects one of the plurality of sheet feeding units and records the image on the recording medium in accordance with a size and an orientation of the selected sheet feeding unit.

13. A method according to claim 11, wherein in a case where a selected sheet feeding unit, capable of containing a recording medium on which the image may be recorded without rotating the image, is empty, said control step causes said rotating step to perform rotating processing, and said recording step records the image on the recording medium obtained from another sheet feeding unit containing a recording medium having the same size as, but set in a different orientation than that stored in the selected sheet feeding unit.

14. A method according to claim 11, further comprising a reading step for reading an image on a document and generating the image signal based on the image, wherein said input step inputs the image signal generated in the reading step.

15. A method according to claim 14, wherein said reading step further comprises reading images on documents which are fed successively from an auto document feeder.

16. A method according to claim 11, wherein said rotating step performs rotation of the image by controlling memory access to the memory in which the image signal should be stored.

17. A method according to claim 16, wherein said rotating step controls write access in a case of storing the image signal into the memory.

18. A method according to claim 16, wherein said rotating step controls read access in a case of reading out the image signal stored in the memory.

19. A method according to claim 16, wherein the memory stores the image signal together with control information which indicates a process in the case of recording the image based on the image signal by said recording step, and said rotating step controls memory access relating to the image signal and to the control information.

20. A method according to claim 19, wherein the control information indicates a recording color in a case of recording the image in said recording step.

* * * * *

UNITED STATES PATENT AND TRADEMARK OFFICE
CERTIFICATE OF CORRECTION

PATENT NO.   : 6,525,834 B2
DATED        : February 25, 2003
INVENTOR(S)  : Mitsuru Kurita et al.

It is certified that error appears in the above-identified patent and that said Letters Patent is hereby corrected as shown below:

Column 2,
Line 61, "two color" should read -- two-color --.

Column 10,
Line 6, "⑤→④," should read -- ⑥→④, --.

Signed and Sealed this

Twenty-eighth Day of October, 2003

JAMES E. ROGAN
*Director of the United States Patent and Trademark Office*